(12) United States Patent
Torunoglu et al.

(10) Patent No.: US 8,490,034 B1
(45) Date of Patent: Jul. 16, 2013

(54) TECHNIQUES OF OPTICAL PROXIMITY CORRECTION USING GPU

(75) Inventors: Ilhami H. Torunoglu, Monte Sereno, CA (US); Ahmet Karakas, Palo Alto, CA (US); Erich E. Elsen, Mountain View, CA (US)

(73) Assignee: Gauda, Inc., Palo Alto, CA (US)

( * ) Notice: Subject to any disclaimer, the term of this patent is extended or adjusted under 35 U.S.C. 154(b) by 0 days.

(21) Appl. No.: 13/178,883

(22) Filed: Jul. 8, 2011

Related U.S. Application Data

(60) Provisional application No. 61/362,565, filed on Jul. 8, 2010.

(51) Int. Cl.
*G06F 17/50* (2006.01)
(52) U.S. Cl.
USPC .............................................. 716/55; 716/53
(58) Field of Classification Search
USPC .................................................... 716/53, 55
See application file for complete search history.

(56) References Cited

U.S. PATENT DOCUMENTS

| | | | |
|---|---|---|---|
| 2006/0242618 A1* | 10/2006 | Wang et al. | 716/19 |
| 2007/0011648 A1* | 1/2007 | Abrams | 716/21 |
| 2007/0130559 A1* | 6/2007 | Torunoglu et al. | 716/19 |
| 2007/0186206 A1* | 8/2007 | Abrams et al. | 716/19 |

* cited by examiner

*Primary Examiner* — Jack Chiang
*Assistant Examiner* — Mohammed Alam
(74) *Attorney, Agent, or Firm* — Aka Chan LLP

(57) ABSTRACT

Computationally intensive electronic design automation operations are accelerated with algorithms utilizing one or more graphics processing units. The optical proximity correction (OPC) process calculates, improves, and optimizes one or more features on an exposure mask (used in semiconductor or other processing) so that a resulting structure realized on an integrated circuit or chip meets desired design and performance requirements. When a chip has billions of transistors or more, each with many fine structures, the computational requirements for OPC can be very large. This processing can be accelerated using one or more graphics processing units.

20 Claims, 20 Drawing Sheets

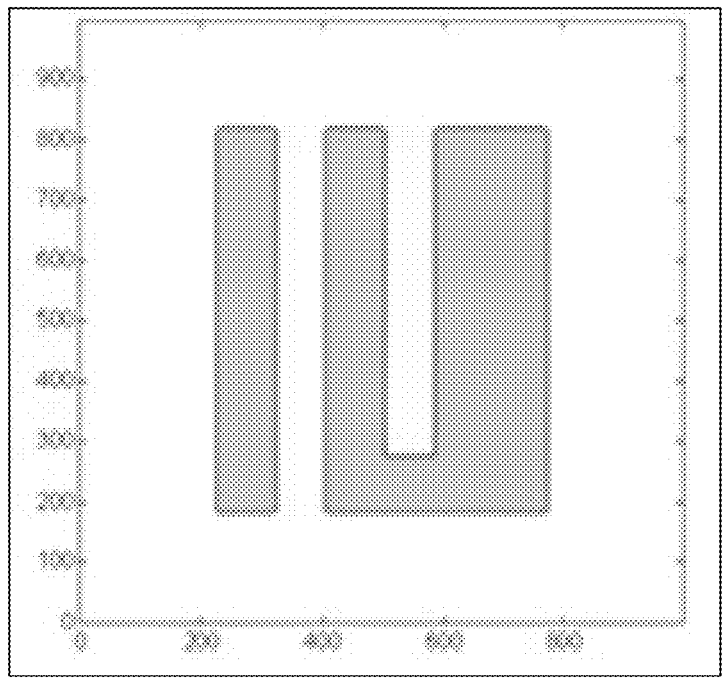
Figure 4.1A
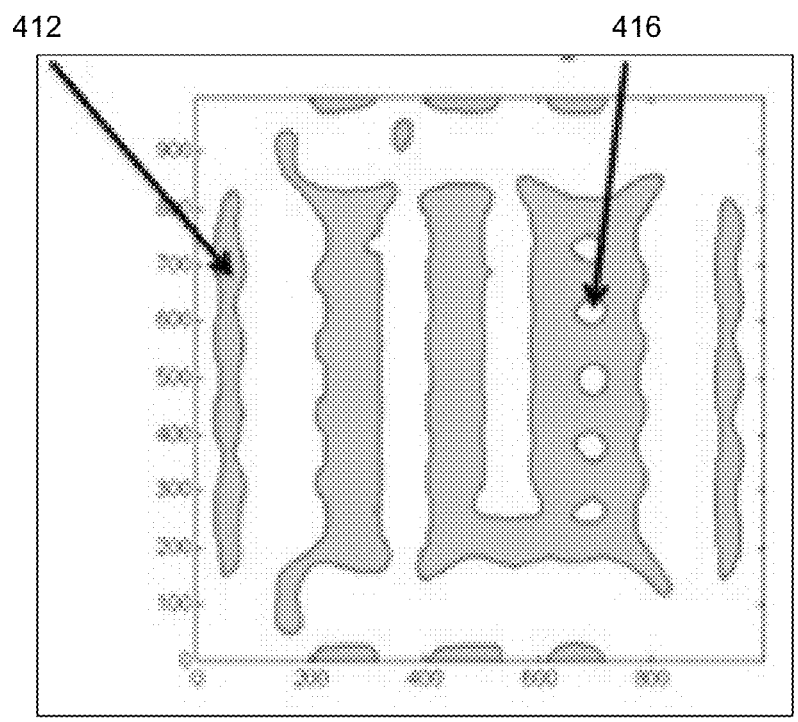
Figure 4.1B

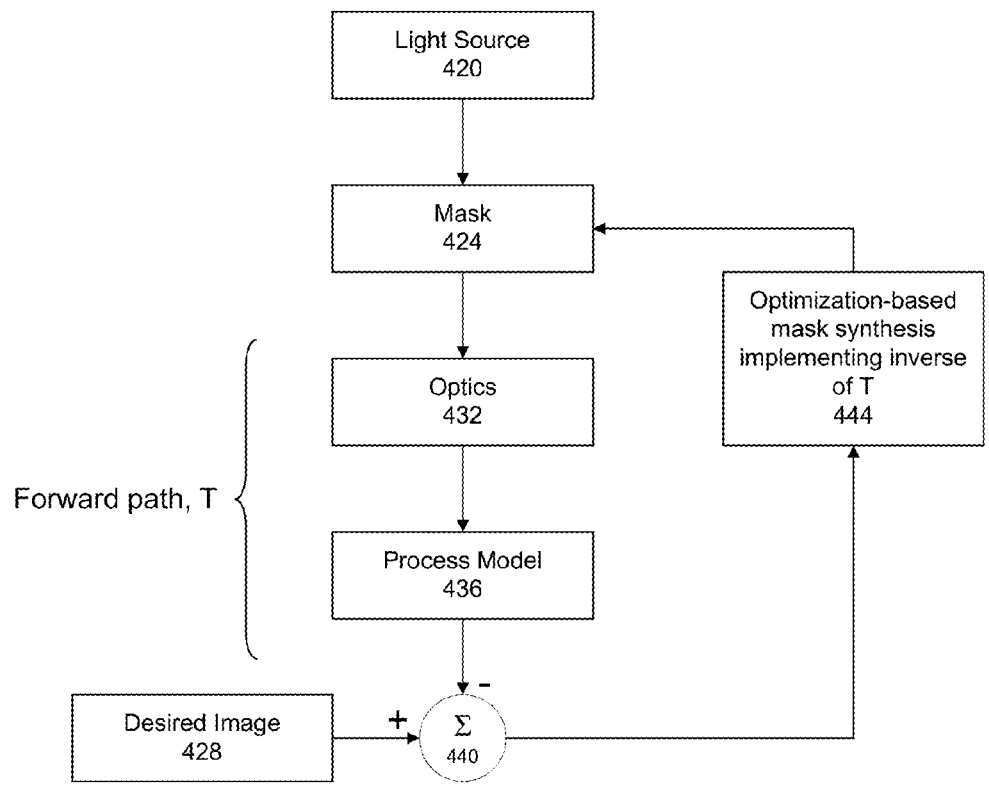
Figure 4.2

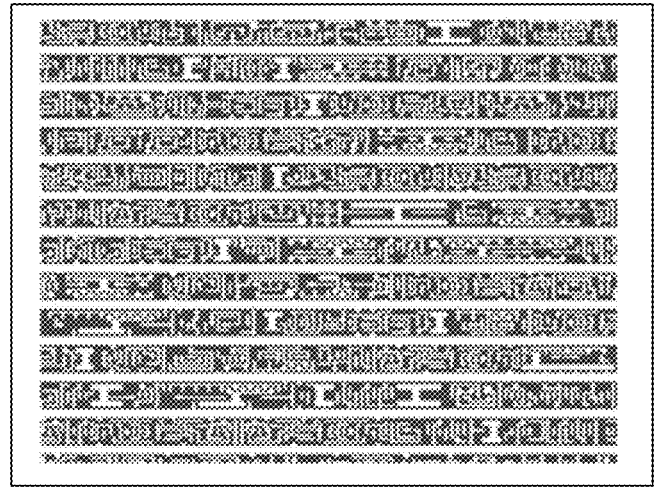
Figure 4.3A
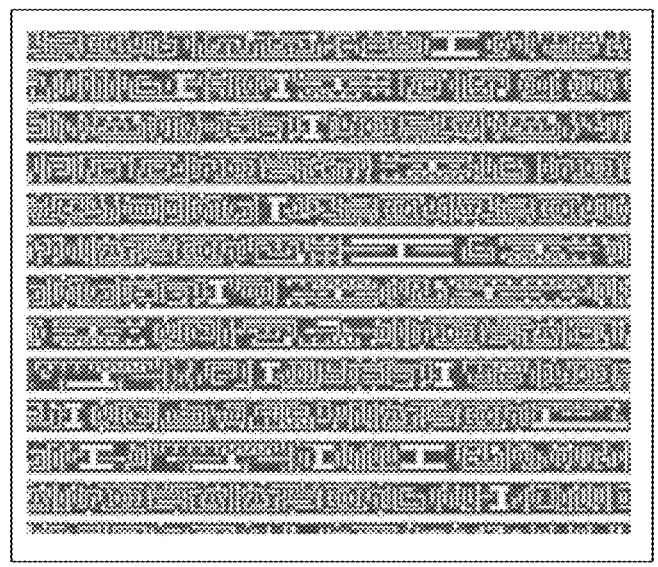
Figure 4.3B

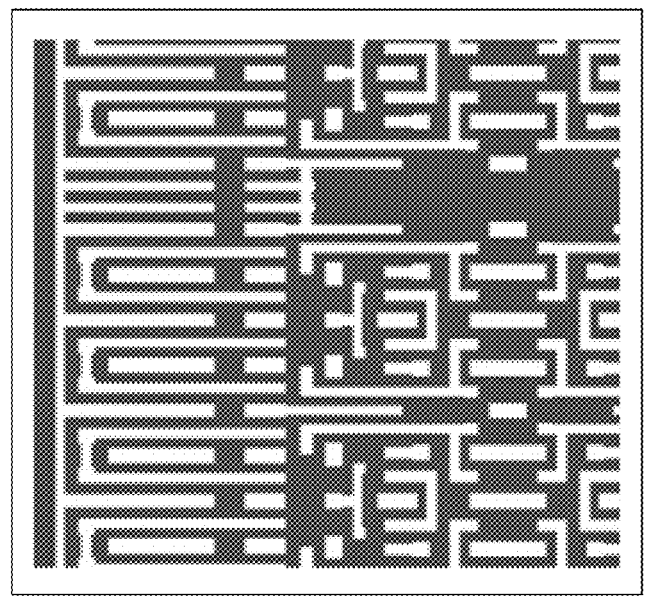
Figure 4.3C
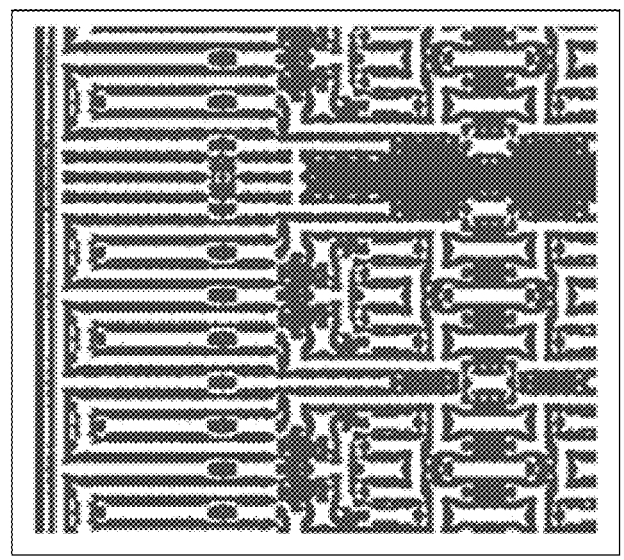
Figure 4.3D

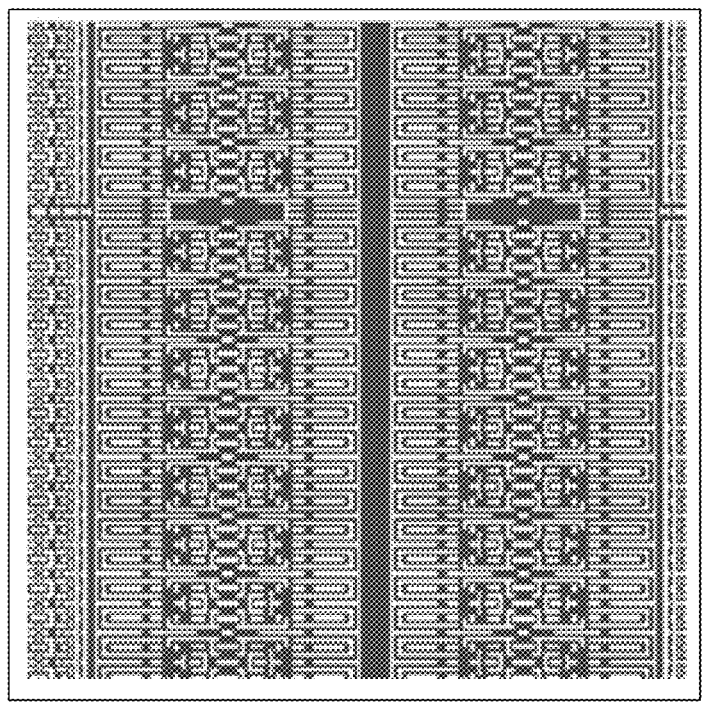
Figure 4.3E
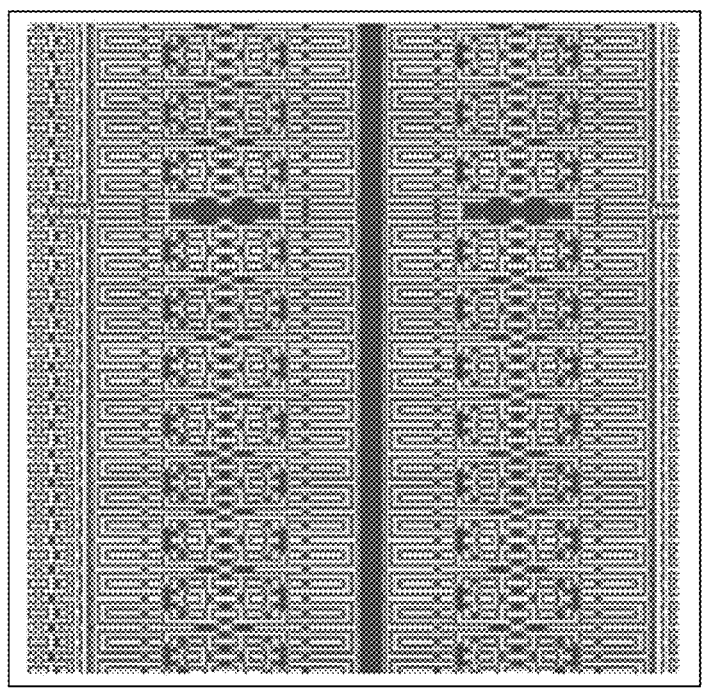
Figure 4.3F

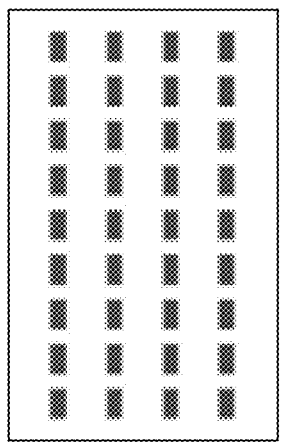
Figure 4.4A
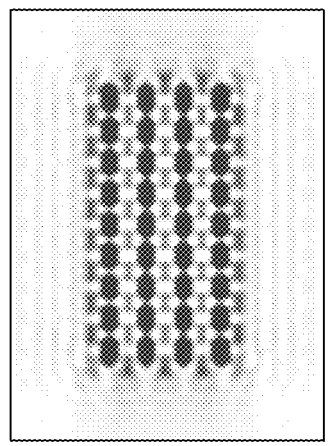
Figure 4.4B
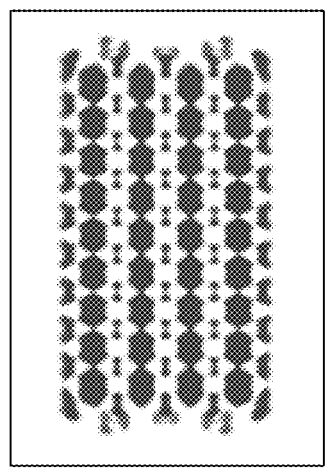
Figure 4.4C

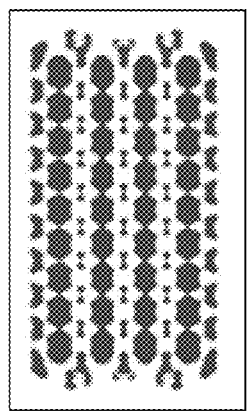
Figure 4.4D
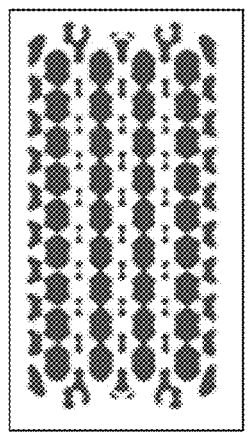
Figure 4.4E
Figure 4.4F

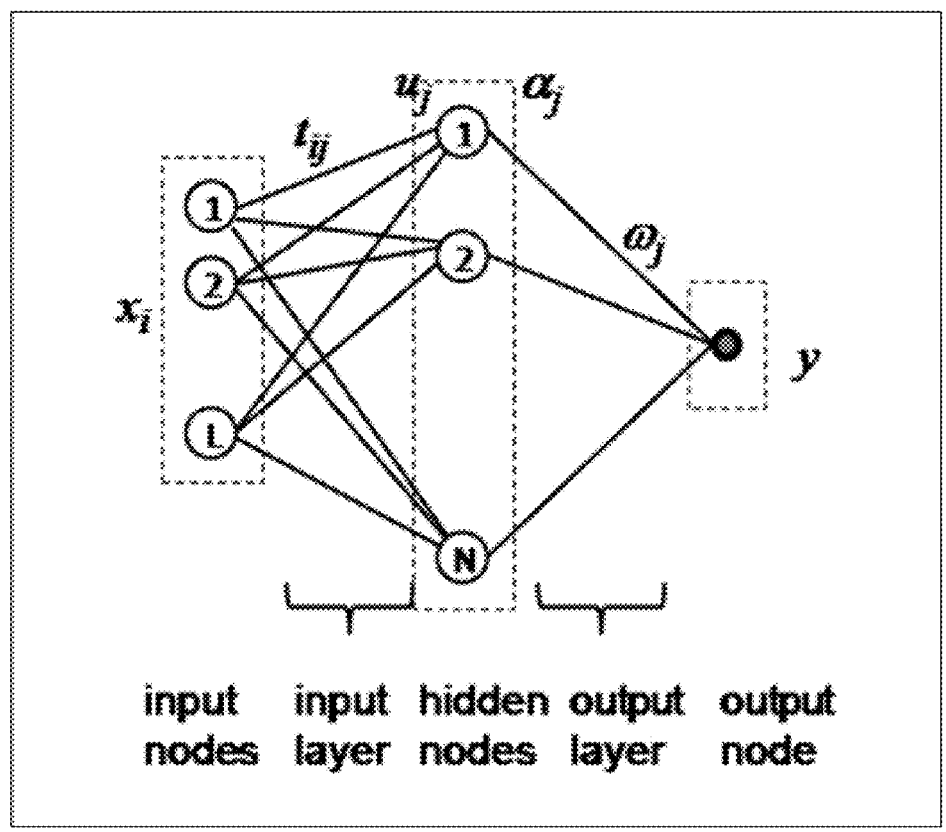
Figure 5.1

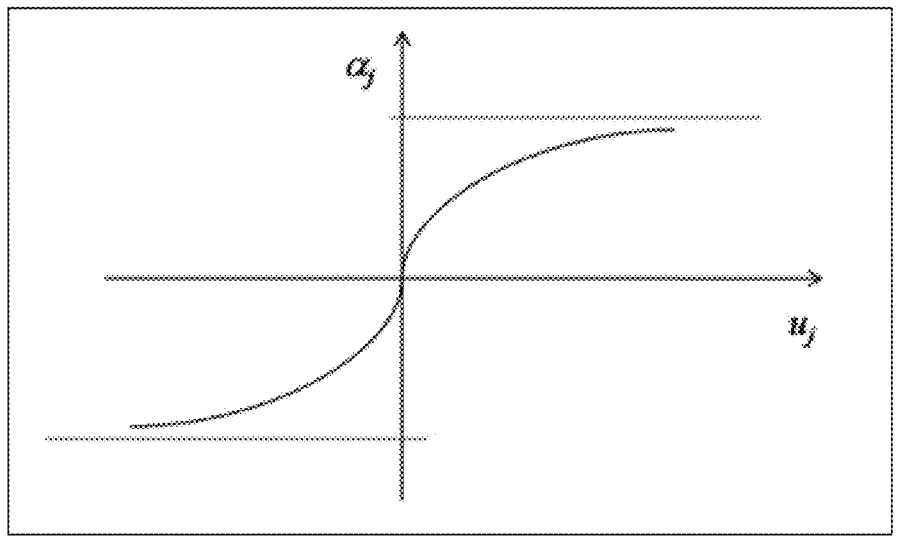
Figure 5.2
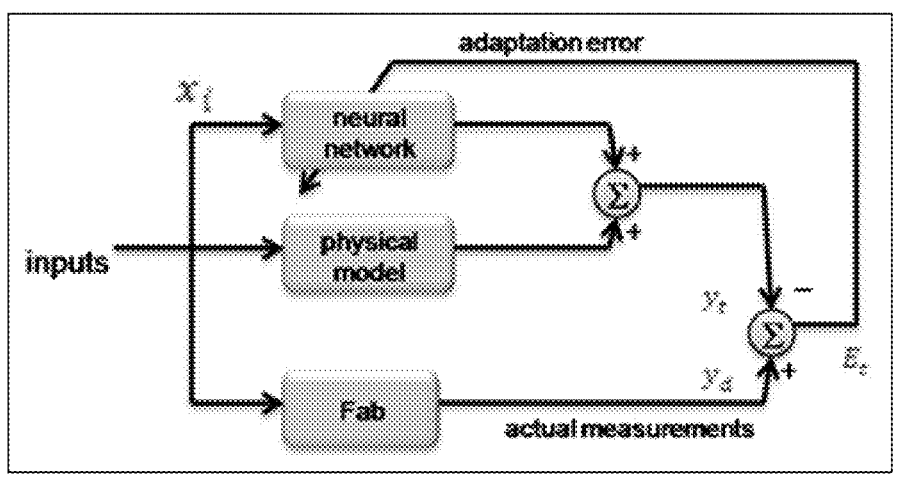
Figure 5.3

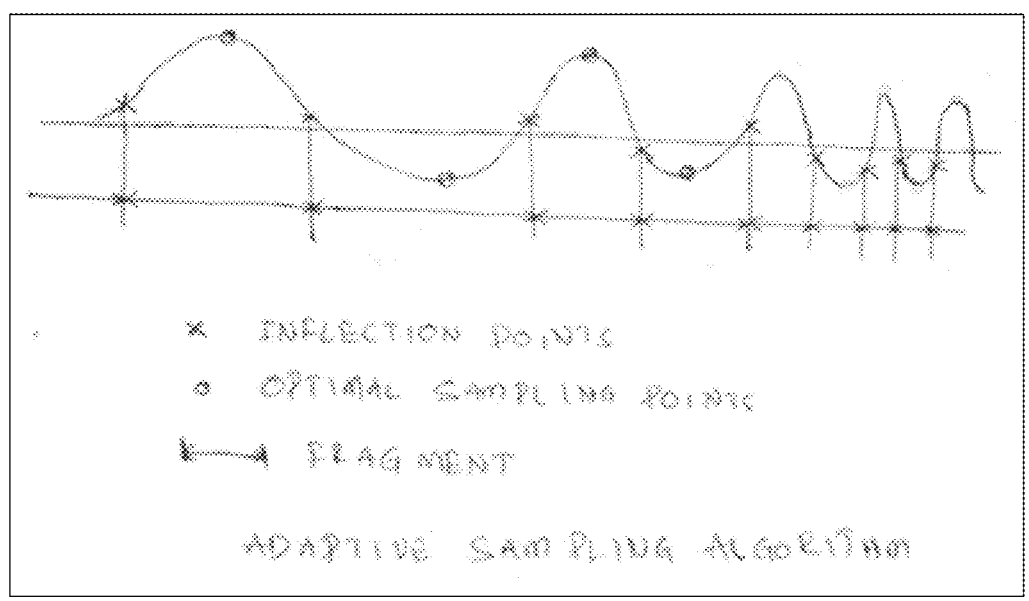
Figure 6.1

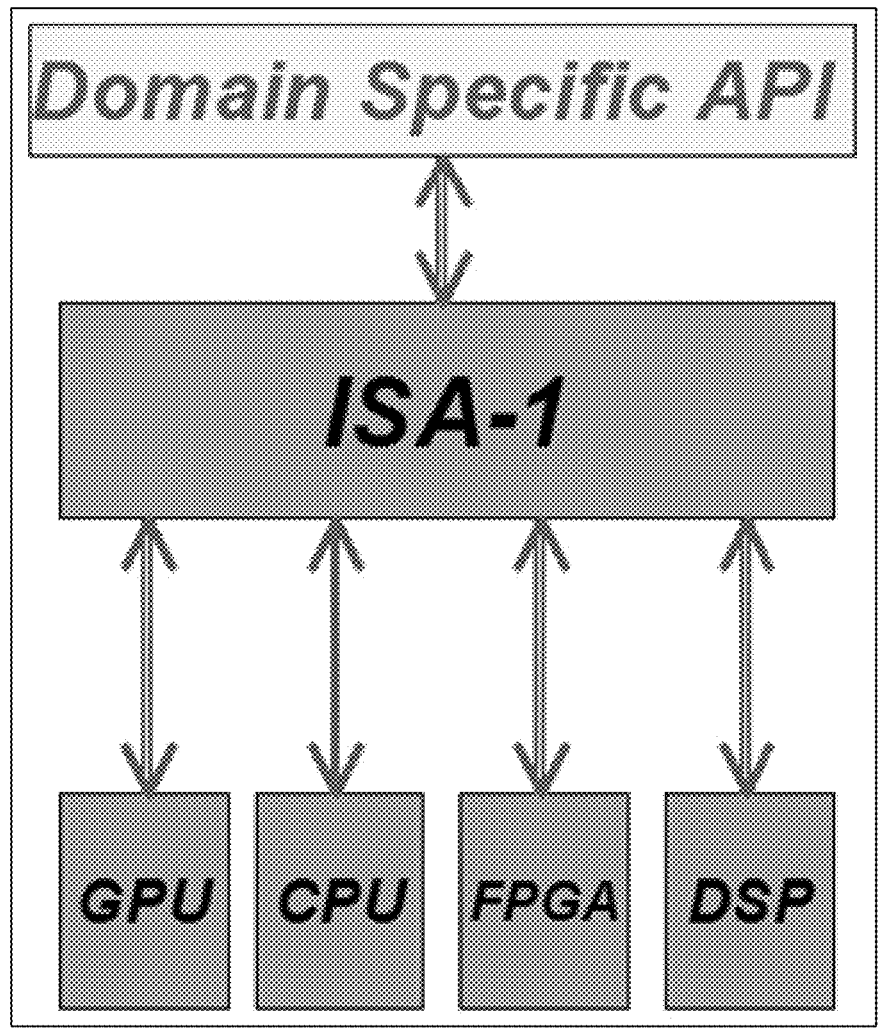
Figure 7.1

| Platform | Compute (GFLOPS) | Memory BW | Growth per year |
|---|---|---|---|
| GPU | 360 | 81 G | 2x |
| Cell | 180 | 26G | ? |
| CPU | 24 / 48 | 10 G | 1.3x |
| DSP | 20 | 5 G | 1.3x |
| FPGA | 10 | 1 G | 2x |
| ASIC | 100 | 100 G | 2x |

Figure 8.1

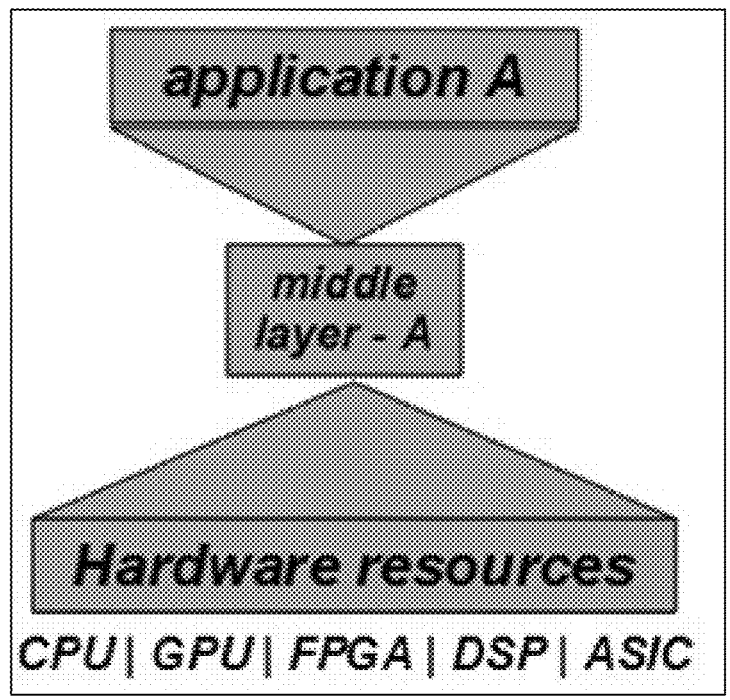
Figure 8.2
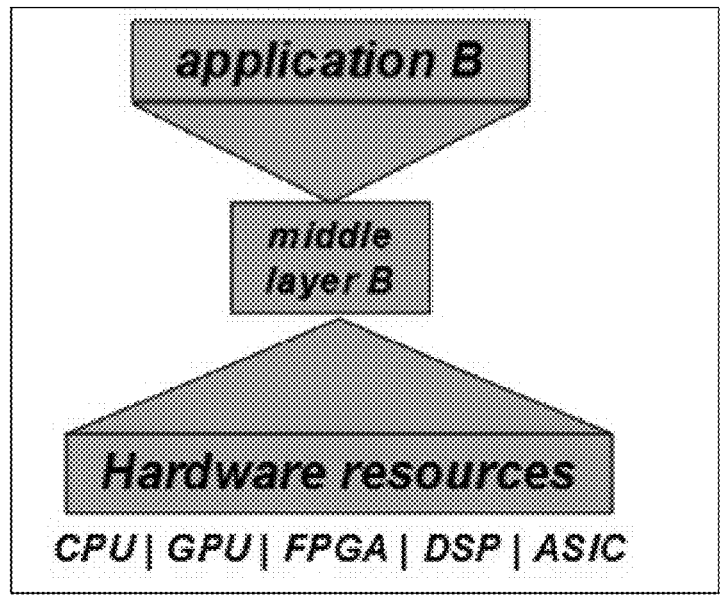
Figure 8.3

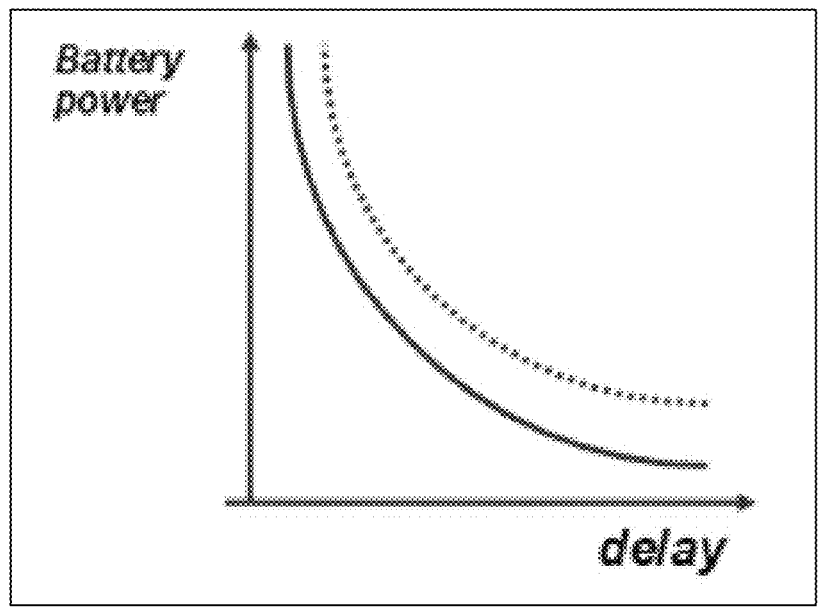
Figure 8.4
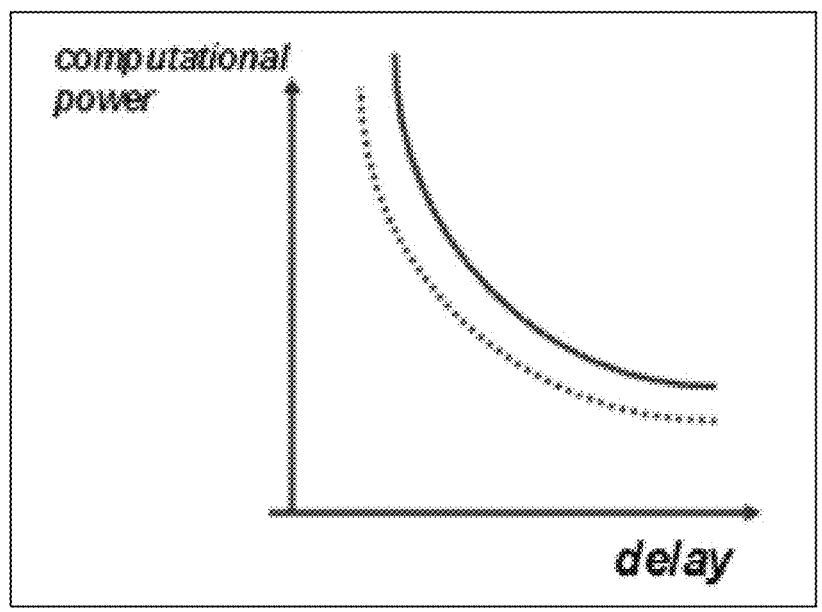
Figure 8.5

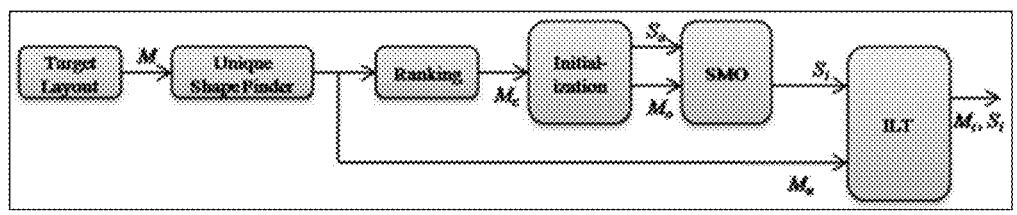
Figure 9.1

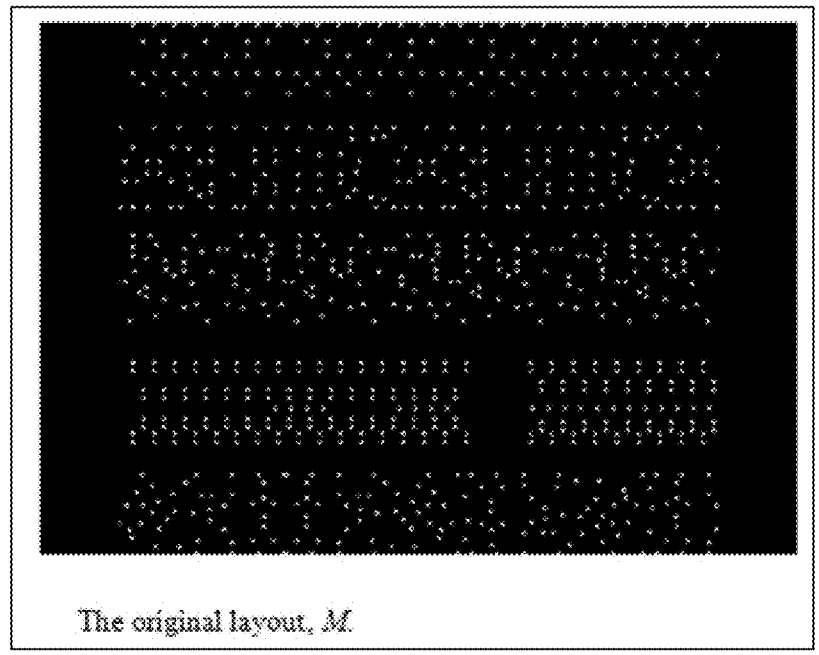
Figure 9.2
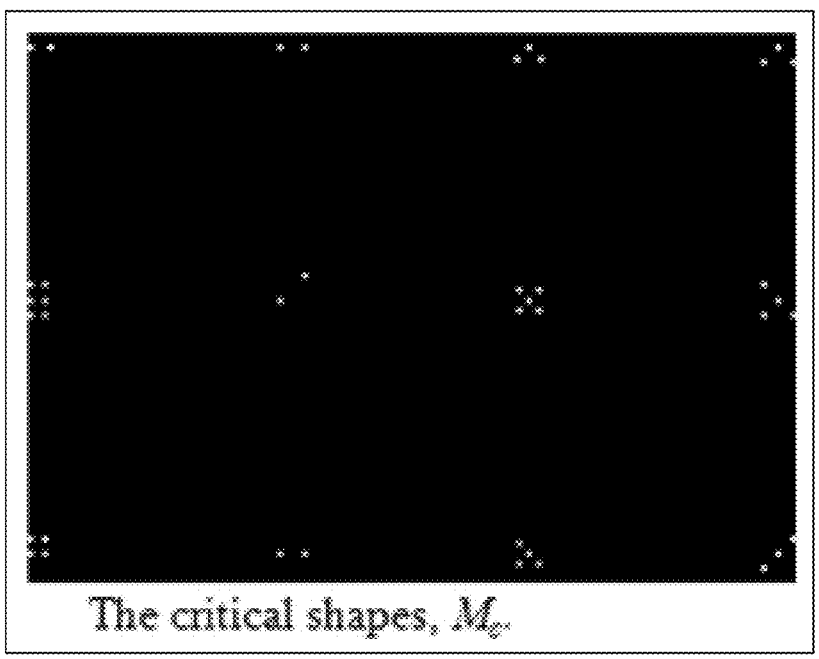
Figure 9.3

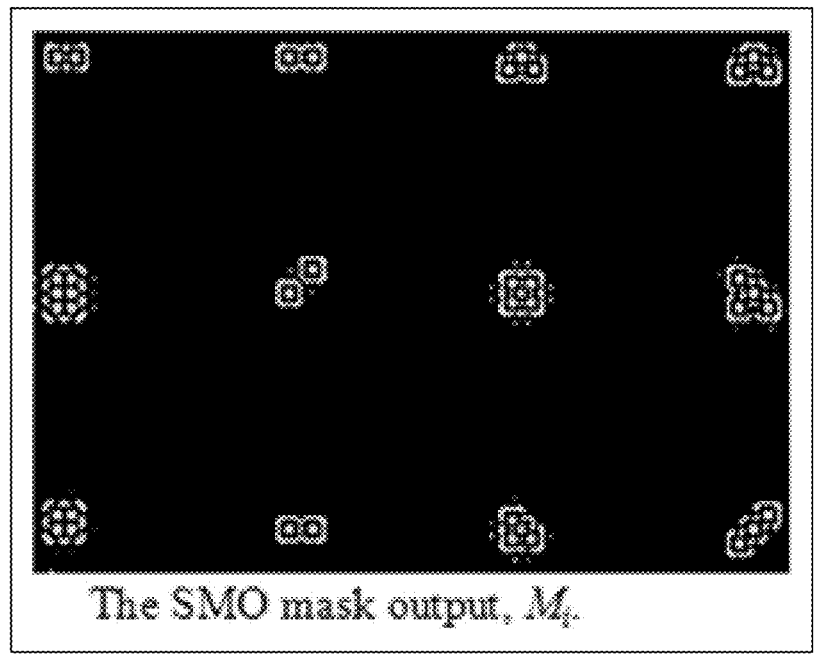
Figure 9.4
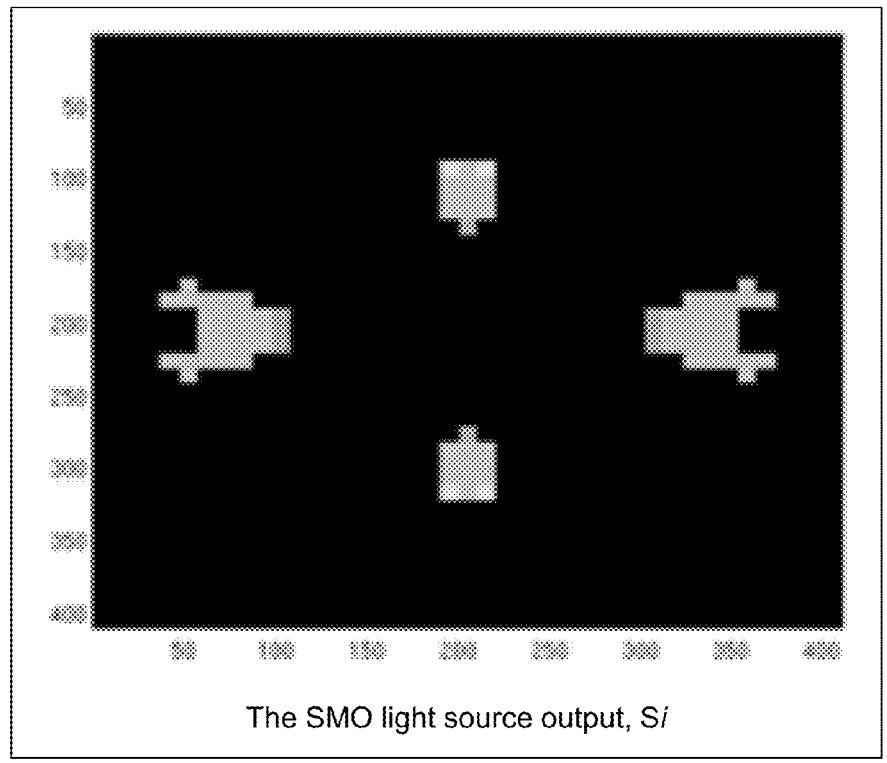
Figure 9.5

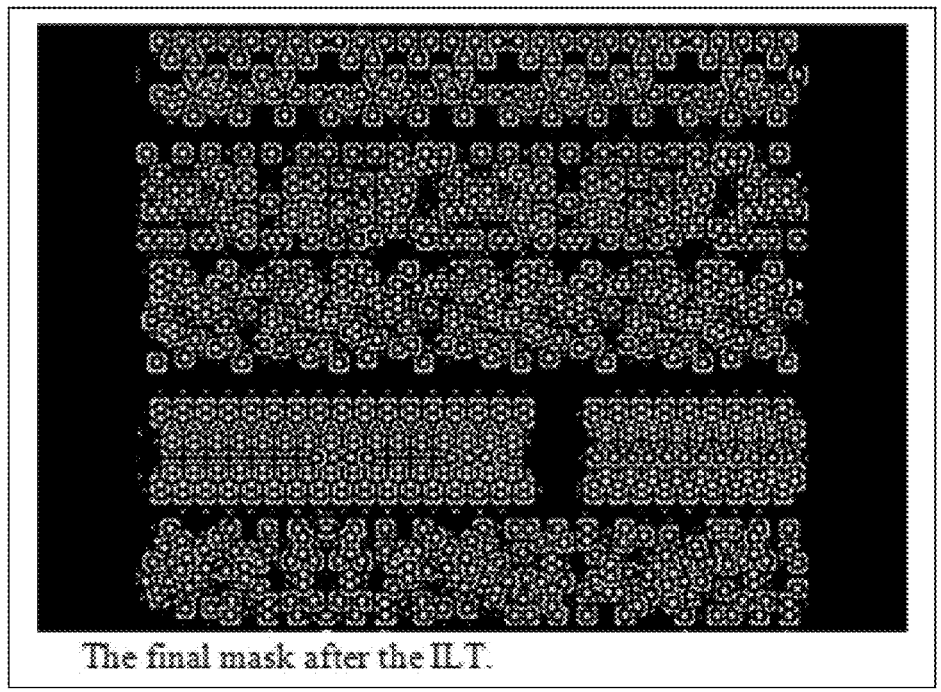
Figure 9.6

TECHNIQUES OF OPTICAL PROXIMITY CORRECTION USING GPU

CROSS-REFERENCE TO RELATED APPLICATIONS

This application claims priority to U.S. provisional patent application 61/362,565, filed Jul. 8, 2010, which is incorporated by reference along with all other references cited in this patent application.

BACKGROUND OF THE INVENTION

The present invention relates to the field of electronic design automation and, in particular, to improved techniques for computationally efficient and accurate optical proximity correction.

Optical proximity correction or OPC is a photolithography enhancement technique commonly used to compensate for image errors due to diffraction or process effects. The need for OPC is seen mainly in the making of semiconductor devices and is due to the limitations of light to maintain the edge placement integrity of the original design, after processing, into the etched image on the silicon wafer. These projected images appear with irregularities such as line widths that are narrower or wider than designed, these are amenable to compensation by changing the pattern on the photomask used for imaging. Other distortions such as rounded corners are driven by the resolution of the optical imaging tool and are harder to compensate for. Such distortions, if not corrected for, may significantly alter the electrical properties of what was being fabricated. Optical Proximity Correction corrects these errors by moving edges or adding extra polygons to the pattern written on the photomask. The objective is to reproduce, as well as possible, the original layout drawn by the designer in the silicon wafer.

Using traditional approaches, optical proximity correction is computationally complex and takes significant amount of computing resources and time. An improved approach with techniques that utilize graphical processing units (GPUs) is needed to accelerate optical proximity correction.

BRIEF SUMMARY OF THE INVENTION

A technique of the invention uses adaptive fragmentation and sampling for optical proximity correction.

A technique of the invention uses an approximate calculation of two-dimensional (2D) matrix entries via graphics processing units to perform computations.

A technique of the invention uses optical proximity correction on hardware or software platforms with graphics processing units. Optical proximity correction techniques performed on one or more graphics processors improve the masks used for the printing of microelectronic circuit designs.

A technique of the invention uses a graphics processing unit-based full-chip inverse lithography solution for random patterns. In an implementation, this technique involves selecting a computational platform, a forward path process simulation, modeling optics, process modeling, or mask modeling, a feedback path using an optimization-based mask synthesis method. In another implementation, this technique uses full-chips. In this implementation, random logic experiments with flattened designs, random logic experiments with hierarchical data processing, and repetitive structure experiments may be performed.

A technique of the invention uses a modeling approach for mask and wafer process simulation. In an implementation, physical models for mask modeling, physical models for wafer processing, modeling optics, processing modeling, neural networks for nonlinear mapping may be used.

A technique of the invention uses adaptive sampling and fragmentation algorithms for optical proximity correction.

A technique of the invention uses an instruction set architecture-based hardware and software platform for electronic design automation. An implementation may use parallel processing systems, virtual machines, instruction sets, instruction sets for electronic design automation and TCAD processes.

A technique of the invention uses an optimal implementation of computational algorithms on hardware-software platforms with graphical processing units.

A technique of the invention uses a graphics processing unit-based full-chip source-mask optimization solution. An implementation of the invention may use a hierarchical selection of critical features. Another implementation of the invention may use a source-mask optimization algorithm. This algorithm may include in initialization method, an initialization of a light source, offspring generation and selection strategy, initialization of a mask, an optimization algorithm, source shape optimization, or mask shape optimization.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 4.1a shows a simple original layout of a circuit before ILT processing.

FIG. 4.1b shows the simple original layout in FIG. 4.1a after ILT processing.

FIG. 4.2 shows a specific flow of an ILT optimization loop to generate an inverse model.

FIGS. 4.3A-4.3F show several random logic and repetitive structure full-chip cases.

FIGS. 4.4A-4.4F show a specific progression of an optimized process illustrated for a simple layout.

FIG. 5.1 shows a basic neural network structure.

FIG. 5.2 shows a graph of a sigmoid function.

FIG. 5.3 shows an overall process modeling system architecture.

FIG. 6.1 shows a graph related to an adaptive sampling algorithm.

FIG. 7.1 shows a simple block diagram of accessing a bank of computation engines through an application programming interface (API) and Instruction Set Architecture.

FIG. 8.1 shows a table listing typical computation platforms.

FIG. 8.2 shows a diagram of an application A, a middle layer—A, and hardware resources.

FIG. 8.3 shows a diagram of an application B, a middle layer—B, and hardware resources.

FIG. 8.4 shows a graph of delay on an x-axis and battery power on a y-axis.

FIG. 8.5 shows a graph of delay on an x-axis and computational power on a y-axis.

FIG. 9.1 shows a block diagram of a proposed source-mask optimization methodology.

FIGS. 9.2-9.6 show an example of a shape processed according to a specific embodiment of the invention.

DETAILED DESCRIPTION OF THE INVENTION

This application incorporates by reference U.S. patent application Ser. Nos. 11/566,140, filed Dec. 1, 2006, issued as U.S. Pat. No. 7,546,574 on Jun. 9, 2009; 11/566,146, filed Dec. 1, 2006; 11/864,296, filed Sep. 28, 2007; 60/827,333, filed Sep. 28, 2006; 11/864,343, filed Sep. 28, 2007; 60/827,295, filed Sep. 28, 2006; 11/875,650, filed Oct. 19, 2007; 60/862,362, filed Oct. 20, 2006; 11/864,381, filed Sep. 28, 2007, issued as U.S. Pat. No. 7,716,627 on May 11, 2010; and 11/864,419, filed Sep. 28, 2007.

Figure 1:
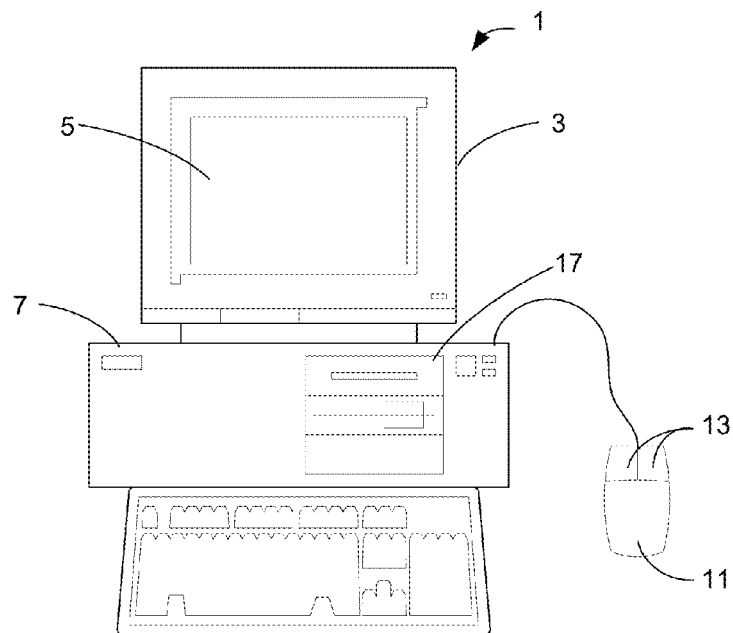
FIG. 1 shows a system of for performing electronic design automation.

FIG. 1 shows a system of the present invention. In an embodiment, the invention is software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor, memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
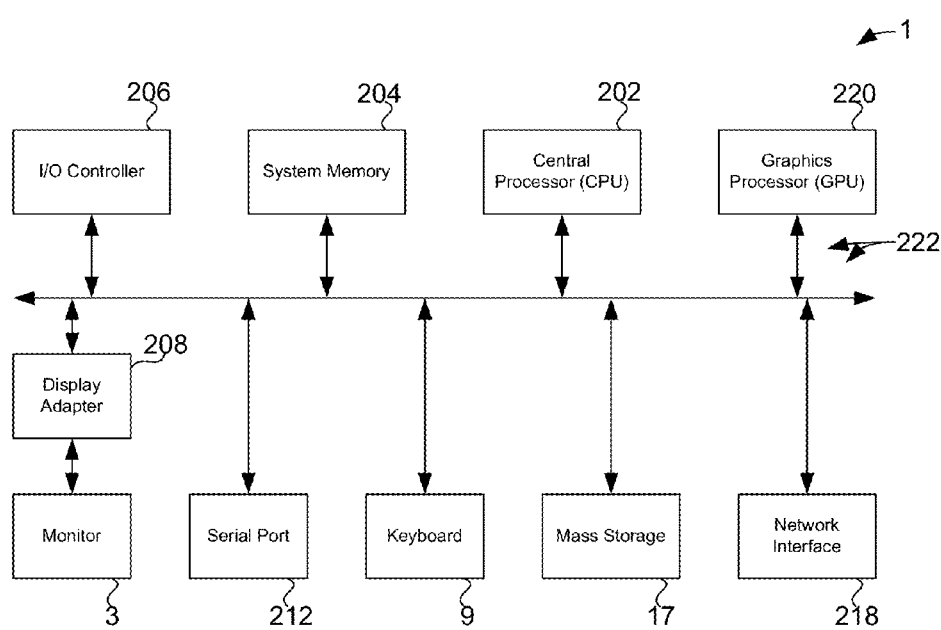
FIG. 2 shows a simplified system block diagram of a computer system.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor (CPU) 202, system memory 204, input/output (I/O) controller 206, display adapter 208, serial or universal serial bus (USB) port 212, network interface 218, and graphics processor (GPU) 220. The invention may also be used with computer systems with additional or fewer subsystems. For example, a computer system could include more than one processor 202 or 220, or both. Such a system may be referred to as a multiprocessor system. The system may include on-chip or external cache memory.

The computer system may include any number of graphics processors. The graphics processor may reside on the motherboard such as being integrated with the motherboard chipset. One or more graphics processors may reside on external boards connected to the system through a bus such as an ISA bus, PCI bus, AGP port, PCI Express, or other system buses. Graphics processors may on separate boards, each connected to a bus such as the PCI Express bus to each other and to the rest of the system. Further, there may be a separate bus or connection (e.g., Nvidia SLI or ATI CrossFire connection) by which the graphics processors may communicate with each other. This separate bus or connection may be used in addition to or in substitution for system bus.

Each processor, CPU or GPU, or both, may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Section 1 Adaptive Fragmentation and Sampling for Optical Proximity Correction

The optimization of masks used for photolithographic printing of circuit designs is known in the field as optical proximity correction (OPC). A fundamental idea behind OPC is to modify the mask to correct for nonidealities that occur during pattern transfer.

The a-priori (before the decoration) selection of both fragmentation size and location based on a set of predefined rules may result in suboptimal results. In addition, fragmentation results may affect both the mask error enhancement factor (MEEF) and mask manufacturability of the final decorated layout. Therefore what is needed is a constrained adaptive fragmentation.

One can model the mask decoration problem as a system control problem where only controls changing system outputs (e.g., wafer contours) are the fragments. It can be predicted that if there are not enough controls (e.g., fragments), the desired results may not be generated. In system theory perspective, a similar problem called controllability of a system exists. For example, if the system we would like to control has a linear behavior (y=ax+b), parameters are generated for any output. In the same token, it is desired to find, for any given layout, the amount of control parameters needed.

In an algorithm, an adaptive fragmentation analyzes each polygon, its wafer contour, light slope, MEEF using the target layout and the manufacturing constraints, then performs fracturing accordingly. As a result, the fracturing adds more fractures where it is needed to perform enough correction (controllability).

Figure 3:
FIG. 3 shows results of an adaptive method.

In addition, the locations of sites used to compute edge placement error (EPE) also affects the quality of results. In system theoretic perspective, this problem is known as the observability problem. As in the previous example, if the underlying system is linear, then we will need at least observations in two different locations. To resolve this issue, oversampling of wafer contours has been used for the EPE calculation, but this solution increases the computation time prohibitively. To this end, an adaptive site selection method has been deployed. In essence, the adaptive method decides on how many measurement sites for each fragment based on its wafer contour, size, location (e.g., edge or corner). FIG. 3 shows results of an adaptive method.

Section 2 Approximate Calculation of Two-Dimensional (2D) Matrix Entries Via Graphics Processing Units In scientific computations, two-dimensional matrix representations can be implemented as lookup tables. For example, physics and image processing may use lookup tables. A finite set of values can be calculated beforehand and stored in memory to avoid real-time computations. With this approach, the computational burden is replaced with increased communication with the memory. In cases where these tables cannot fit into fast-speed memories such as an L1 cache, frequent access to these tables significantly slows down the computational speed. A technique or method provides a replacement of one or more computations with communication (memory access). This is advantageous because graphics processing units have better handling of arithmetic complexity than those based on random access.

For example, the nVidia 7900 series graphics processing unit, at its peak, can handle 24×2×(4-vector)=48×(4-vector) computations in 1 clock cycle. This is equivalent to 24 billion (or 24G) 4-component-operations, i.e., 96 Gflopsx. At the same time, the same graphics processing unit can access memory with a peak performance of 35 Gigabytes/sec access speed. Unfortunately, in the case of random texture accesses this number reduces to 4 Gigabytes/sec. In other words, in the random access case, one can perform 256 million 4-component accesses (4 Gigabytes/4 Components/4 bytes per component=256 million 4-component-accesses). In other words, one can replace one random 4-component texel access with 196 4-vector computations. The present application will describe this case in more detail.

Conversion of Two-Dimensional Lookup Tables into Computations

This section explains the three steps for converting a two-dimensional Matrix memory lookup into computations in graphics processing units. A specific implementation of steps is presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different or alternative order than presented, or any combination of these. Certain steps may be repeated as needed. Further, the steps in other implementations of the invention may not be exactly the same as the steps presented and may be modified or altered as appropriate for a particular application or based on the circumstances.

Step 1. Decomposition of Two-Dimensional (2D) Lookup Table into One-Dimensional (1D) Orthogonal Tables By way of example, a two-dimensional lookup table, h, contains one complex number per entry. For a graphics processing unit, there are two complex numbers. In this case, there are four entries. An arbitrary two-dimensional matrix can be decomposed into a sum of outer products of two one-dimensional orthogonal functions. This can be mathematically represented as $$h(n1,n2)=\mathrm{Sum}(hk1(n1)*hk2(n2)).$$

A two-dimensional lookup table can be partitioned by using a Singular Value Decomposition (SVD) technique.

The two-dimensional lookup table that represents the sum, h, can be represented with 10-4 accuracy by using eight one-dimensional tables. In other words, by performing 16 table accesses (8 accesses per dimension), the same table, h, can be generated. However, this approach also uses 16 times more accesses to the memory.

Further simplifications can be performed if the one-dimensional functions have certain properties. For example, if the one-dimensional functions are symmetric or skew symmetric, these properties allow us to reduce the amount of data to be stored by half. Nevertheless, this operation does not reduce the lookup count.

Step 2. Representation of One-Dimensional Functions as Polynomials

A lookup operation can be replaced with direct computation by representing each one-dimensional function using a polynomial representation. In an implementation, each lookup operation is replaced. In an embodiment, the one-dimensional bases can be represented by 20-25$^{th}$ order polynomials. In this embodiment, each lookup table can be replaced with a 20$^{th}$ degree polynomial computation. The 20$^{th}$ degree polynomial with constant coefficients can be programmed into the fragment program a-priori.

However, in this case, each two-dimensional lookup has been replaced with 16 (eight per one-dimensional function)×

20=320 computations (multiply-add operation). Although there is no lookup in this case, it requires considerable amount of computation.

By way of example, hk1 and hk2 can be the one-dimensional functions. If the hk1 and hk2 functions are either identical to or conjugate (reverse) of each other, the computations can be further reduced by half. In this case, the total required number of computations is 8×20=160.

Step 3. Computational Efficiency Through Mixing Polynomial Representation and Control Structures The computational cost can be reduced by dividing a domain of the hk1 or hk2 functions into subdomains such that in each domain, as shown below, a portion of the one-dimensional function can be represented with a lower degree polynomial. For example, by dividing the domain into 10 subregions, each one-dimensional function can be represented with a $3^{rd}$ order (quadratic) polynomial.

By dividing the index space, n1 or n2, into equal intervals, the hnk1 with a lower degree polynomial can be approximated. The interval in which the given n1 or n2 values lie can be determined by dividing the index by the interval length and by using a switching operation (described below). If a $3^{rd}$ degree polynomial approximation is used, the calculation cost can be reduced to 4 multiplications and a switching operation.

```
IntervalLength=totalIntervalLength/10; //as an example
interval=n1/IntervalLength;
switch (interval)
case 1:
    hnk1=((c3*x+c2)*x+c1)*x+c0;
break;
case 2:
    hnk1=((c7*x+c6)*x+c5)*x+c4;
break;
...
}
```

In other words, the total cost can be reduced. In the above example, the total cost can be reduced to 8×(4+1)=40 computations, which is about 5× faster than the ones employing memory lookup operations.

Section 3 Optical Proximity Correction on Hardware or Software Platforms with Graphical Processing Units The present invention relates to the field of electronic design automation and, in particular, to improved techniques for performing optical proximity correction (OPC).

The manufacture of integrated circuits strives to place ever smaller features onto a given area of an integrated circuit chip. A challenge encountered in this effort to fabricate smaller features is the diffraction of the light used in photolithography. That is, the quality and fidelity of the microlithography stage of very large scale integrated (VLSI) circuit chip production depends on the wavelength of the light source and the size of the features to be printed.

Recent subwavelength lithography approaches aim to use wavelengths that are larger than the minimum feature size to generate the images (e.g., light with a wavelength of 193 nanometers is being used to generate features with dimensions of 90, 65, or 45 nanometers). This approach, however, requires methods or techniques for correcting degradations and distortions in the final pattern caused by light diffraction. That is, the photolithography mask used to generate the desired circuit pattern includes structures that anticipate and, at least partially correct for, the imperfections arising from striving to fabricate small features.

A computational simulation of the exposure and lithographic is run and the degradations or distortions are computed with various additions, inclusions and adjustments to the mask design. A mask design is selected that improves the final structure. These methods, commonly known as OPC, are mainly dependent on the optical system and mask features and may be computationally intensive. While regions having densely packed features tend to be more prone to distortions (the "proximity" effect), OPC calculations are not limited to such regions and can be advantageously applied to less dense regions of the circuit.

OPC typically has numerous features in a pattern layout to be computationally processed one or more times. Recent advances in semiconductor manufacturing allow billions of transistors (e.g., multibillion features) to be placed on a single chip. Moore's law postulates that the number of transistors that can be placed on a single chip doubles about every 12-24 months. Unfortunately, despite the advances in the central processing unit (CPU) clock speed and computing power, the gap between the computational power required for OPC calculations and the available CPU processing power continues to increase. That is, the computing power required to efficiently execute the OPC calculations in a timely manner is growing at a faster rate than the available CPU power in a reasonably priced engineering workstation.

To further complicate the issue, the number of masks or layers to which OPC should be applied increases at each new semiconductor device manufacturing node. Since the features are getting smaller with every manufacturing node while the illumination wavelengths remain the same or decrease at a slower rate, the number of neighboring features affecting the fidelity of each feature increases. Therefore, the computational processing power required to perform OPC operations on new chip designs has been increasing at a rate of approximately factors of three or four or more for each successive manufacturing node.

Presently, the generation of optically corrected masks takes from many hours to several days per mask and the complexity of this process continues to grow. Because the features printed after the OPC process may still be different from the desired features, the impact of each feature on the functionality and performance of the chip is readdressed in an iterative manner. A typical VLSI design process consists of several iterations of mask generation, OPC process, and interpretation of the results. These iterations may contribute several months of delay to the chip qualification and manufacturing process.

The persistent time-to-market pressures on new chip designs mandate improved methods to estimate and shorten the impact of the OPC process in the early stages of the design. Since it is computationally prohibitive to perform many iterations of OPC on a full-chip scale, partial or simple model-based OPC approaches are being applied in limited fashion, still necessitating full-chip OPC once the design is completed.

Therefore, a need exists in the art for improved systems and methods that shorten the time required to perform OPC, improve the accuracy of OPC methods, and are scalable to address larger chip designs.

Section 3.1 Brief Summary

The present invention relates generally to the field of manufacturing integrated circuits and, more particularly, to using optical proximity correction (OPC) to improve the masks used for the printing of microelectronic circuit designs. Specifically, the present invention relates to the execution of OPC techniques on hardware platforms, software platforms, or a combination of these, utilizing specialized processing units.

Accordingly and advantageously the present invention relates to systems, techniques, and methods for the execution of OPC algorithms on hardware platforms, software platforms, or a combination of these, with specialized processing units.

In an embodiment of the present invention, spatial domain OPC computations are executed on a hardware system, software system, or a combination of these, comprising one or more specialized processing units. Some examples of specialized processing units include central processing units (CPUs), graphics processing units (GPUs), physics processors, cell processors, digital signal processors (DSPs), field programmable gate arrays (FPGAs), and application specific integrated circuits (ASICs). Other specialized processing units may be used. Portions of an OPC computational task may be transformed into a form of mathematical manipulations on matrices, vectors, or both. Graphics processing units may be particularly well suited to performing such operations on matrix and vector data.

The graphics processing unit or graphics processing units may operate on the data until the result converges on the target model within a predetermined error limit. Some examples of operations performed may include changing the shapes of mask features and may also include a detailed model of the illumination and optics systems used for exposing the pattern in the photoresist layer. The final data may be transformed back to the original data format and exported for generation of the mask used to print the pattern on the semiconductor device. Graphics processing units will be used as an example of a specialized processor, but this is not intended to limit the scope of the teaching of the present invention to graphics processing units. The present invention may utilize any of the specialized processors mentioned previously, and other substantially similar processors as understood by those having ordinary skill in the art and as similar or related processors may be developed later.

In an embodiment, the invention is includes: a computing system having at least one central processing unit and at least one graphics processing unit; a user interface for interacting with the computer system; a computer readable medium including data describing the size and placement of features to be formed on a photolithography exposure mask used to manufacture semiconductor devices; a computer readable medium including optical proximity correction calculation procedures for acting upon the data, where at least a portion of the optical proximity correction calculation procedures are executed using the graphics processing unit; and output devices for displaying the results of applying the optical proximity correction calculation procedures executed using the graphics processing unit upon the data.

In an embodiment, the invention is a method including: providing a system having at least one central processing unit and at least one graphics processing unit; separating an optical proximity correction process into tasks depending on a type of computation required; allocating the tasks of the optical proximity correction process to the central processing unit or the graphics processing unit; and delivering output of the central processing unit and the graphics processing unit as a result of the optical proximity corrections process.

In an embodiment, a system of the invention includes: a computing system including a number of nodes, where each node includes at least one of at least one central processing unit or at least one graphics processing unit; an interface to couple the nodes together; a user interface for interacting with the computer system; a computer readable medium including data describing the size and placement of features to be formed on a photolithography exposure mask used to manufacture semiconductor devices; and a computer readable medium including optical proximity correction calculation procedures for acting upon the data, where at least a portion of the optical proximity correction calculation procedures are executed using the graphics processing unit in one of the nodes.

The interface may be at least one of a peripheral component interconnect (PCI) Express bus, accelerated graphics port (AGP) bus, front side bus, Ethernet, the Internet, or other interface that facilitates the transfer of data in any form including serial or parallel transfer of data. In an embodiment, a computer readable medium having data describing a size and placement of features to be formed on a photolithography exposure mask used to manufacture semiconductor devices may be directly connected to one of the nodes and a portion of the data are passed through the interface to at least one other node. The direct connection may be by way of a different interface than how the nodes are connected. For example, the direct connection may be by an integrated device electronics (IDE), serial advanced technology attachment (SATA), or universal serial bus (USB) interface.

In an embodiment, a computer readable medium having optical proximity correction calculation procedures for acting upon the data is directly connected to one of the plurality of nodes, and at least a portion of the optical proximity correction calculation procedures are executed using the graphics processing unit on a different node from which the optical proximity correction calculation procedures are directly connected. In an embodiment, a computer readable medium having optical proximity correction calculation procedures for acting upon the data is directly connected to one of the nodes, and at least a portion of the optical proximity correction calculation procedures are executed using the graphics processing unit of the node to which the optical proximity correction calculation procedures are directly connected.

A system of the present invention may include a computer readable medium having optical proximity correction calculation procedures to split given layout information into two-dimensional subregions, where these subregion overlap with each other. There may be a computer readable medium having optical proximity correction calculation procedures to transfer the given layout information split-up into two-dimensional subregions to two or more nodes of the system. A computer readable medium having optical proximity correction calculation procedures executing on the two or more nodes may operate on the given layout information split-up into two-dimensional subregions.

A computer readable medium having optical proximity correction calculation procedures to combine results from a first node and a second node on the given layout information split-up into two-dimensional subregions. The optical proximity correction calculation procedures may combine results by stitching together the results by removing the overlapping regions.

Section 3.2 Details

The present invention can be utilized in the improvement of OPC methods used in the manufacture of semiconductor devices.

Structures arising in the manufacture of microelectronic devices are typically formed by creating a pattern of a desired structure in a layer of photoresist deposited over a material in which the desired structure is to be formed. The pattern in the photoresist is created by exposing the photoresist to light through a patterned exposure mask. The exposed photoresist serves as a physical mask during a subsequent etch step or subsequent etch steps where the pattern in the photoresist is transferred to the underlying material.

Distortions and degradations in the final structure arise from a combination of factors including light source variations, optical proximity effects, development process nonuniformities, and etch process nonuniformities, among others. The total amount of energy deposited in a given volume of photoresist during the exposure or printing step will determine if that volume remains or is removed during the subsequent development process. The image features being printed on current microelectronic devices may be much smaller than the wavelengths of light being used to print the features, (e.g., light with a wavelength of 193 nanometers may be used to generate features with dimensions of 90, 65, or 45 nanometers and below). The distortions may cause errors such as line thinning, end shortening, line thickening, and clipping. Distortions may cause other errors.

A feature on the exposure mask is formed with the same size and shape as the desired structure on the chip. Due to the distortions described above, the resulting pattern may not faithfully reproduce the pattern in the exposure mask. The distortions in this particular example may cause the final pattern to be shorter, thinner, and poorly controlled.

Various methods of OPC may be used to improve the fidelity of the final pattern transferred to the target material. The pattern that is formed on the exposure mask may be altered to compensate for various systematic distortions. One such method involves the use of serifs to augment the pattern in areas where the distortions cause feature shortening, thinning, and the like. A serif is understood to be a small feature that may be placed at a corner or vertex of a main feature. The serif may be "positive" in that it adds area to the main feature or it may be "negative" in that it subtracts area from the main feature.

A goal of the OPC process is to calculate, improve, and optimize at least one feature on the exposure mask so that the resulting structure realized on the chip meets the design and performance requirements of the circuit. In an implementation, at least one or more features of the exposure mask are optimized. In another implementation, all features of the exposure mask are optimized. When a chip has billions of transistors, each with many fine structures, the computational requirements for OPC can be very large.

Popular OPC methods in current use include two main classes, frequency domain OPC computations and spatial domain OPC calculations.

The frequency domain (FD) OPC computations use Fourier transform techniques to calculate the deformation of the features on the exposure mask to realize the desired structure on the chip. There are typically several steps to this method:

FD-1. The layout is pixilated (e.g., digitized as a pattern of pixels) and transformed into a two-dimensional frequency domain.

FD-2. The low-pass filtering effects of the process, such as the lens system, etching characteristics, and so forth, are introduced.

FD-3. An inverse filtering process is applied to compensate for the low-pass filtering effects introduced in the previous step.

FD-4. A two-dimensional inverse filtering is applied to transform the results of these calculations back from the frequency domain into the spatial domain.

The accuracy of the frequency domain OPC calculations increases as the number of points used increases. Many points are used to include one or more of the local structures that may impact the distortion of the feature being optimized. However, each of these neighboring local structures must also be optimized. The entire chip may be considered within a single calculation. However, this also dramatically increases the computational requirement. Therefore, this FD method has limited use.

The spatial domain (SD) OPC calculations are based on spatial properties of the features. The edges and vertices of the features on the exposure mask, such as polygons or rectangles, are modified in an effort to minimize the difference between the actual structure realized using the corrected exposure mask and the desired structure. There are several steps to this method.

The candidate control points, or evaluation points, on the edges and vertices are determined based on current design rules. An example of a flow is:

SD-1. For every edge, or fragment of an edge, an edge placement error (EPE) is determined by a model of the optical system. Calculations are performed using system kernels and their convolution with the exposure mask region around each edge.

SD-2. Upon determining an edge placement error, an edge fragment may be "pushed" or "pulled" in an attempt to reduce the error.

SD-3. The simulations and adjustments are repeated several times for each edge fragment until the edge placement error is within the acceptable range for one or more features on the chip. In an implementation, the simulations and adjustments are repeated several times for each edge fragment until the edge placement error is within the acceptable range for all features on the chip.

The spatial domain OPC methods enjoy several benefits over the frequency domain OPC methods. For example, the light effects are generally localized to the features in the immediate vicinity of the feature under consideration. Therefore, a size of a specific calculation may be smaller. However, the same calculation is made for one or more of the feature groups on the chip.

Currently, typical solutions to the OPC computational problem include the use of large systems of multi-CPU computers. This increases the cost of the system and contributes to the cost of the chip. CPUs are typically designed for minimal latency and to address general purpose programs. This hardware configuration will be defined here as a "homogeneous configuration" meaning that the various computational tasks are executed by equivalent processors.

An alternative hardware configuration includes a cooperative collection of specialized processing units where each processing unit may be well suited for a specific type of computation. This hardware configuration will be defined here as a "heterogeneous configuration" meaning that the various computational tasks are executed by different, typically specialized, processors. As an example, graphics processing units are designed specifically for high throughput on specialized types of problems found in graphics processing that perform a large number of arithmetic calculations with a relatively small number of memory access steps. Other specialized processors may be designed to handle other types of data or computational problems. Allocating the various portions of the OPC computations to specialized processors may improve the throughput, increase the efficiency, lower the cost, and improve the results of the computation.

Graphics processing units may be designed for fast graphics processing. The data may be organized into a stream where a stream is an ordered set of data of the same data type. Operations, procedures, methods, algorithms, and the like that may be applied to entire streams of data are typically called kernels. Kernels are very efficient because they depend only on their input. Internal computations within the kernel are independent of other elements of the stream. Therefore, graphics processing units may be designed for parallel processing, memory efficiency, and high throughput for specific problems.

Graphics processing units typically have hardware blocks that may be specifically designed for certain types of problems (e.g., specific kernels may be implemented in hardware). As an example, hardware blocks may be designed to implement various types of vector computations, matrix computations, or both. As an example, graphics data is typically four-dimensional referring to the channel value of the red, green, and blue pixels (referred to as RGB) and the opacity value (typically referred to as alpha or A). Therefore, graphics processing units have been designed to process four-dimensional (RGBA) data very quickly and very efficiently.

Currently graphics processing units have moved to a unified architecture where there are a number of general purpose processors that can be programmed to perform a wide variety of tasks. Specialized hardware capable of performing operations very common in graphics processing exist. For example: bilinear filtering, dot products, and antialiasing. Recognizing the usefulness of these processors for general purpose computation and the difficulty of reexpressing non-graphics applications to take advantage of the RGBA architecture of previous generation chips, most graphics processing unit manufacturers are moving to a scalar architecture where only one component is processed at a time, allowing for a higher utilization of the chip's resources.

CPU-based approaches to improve the OPC procedures typically employ multi-CPU systems as mentioned previously. Such approaches typically have attempted to increase the computational efficiency by dividing the computation into parallel parts at the task level. However, they are not able to exploit additional parallelism at the instruction level due to their general purpose design.

OPC calculations are inherently graphics problems. In one embodiment of the present invention, graphics data may be sent by one or more CPUs to one or more graphics processing units. The graphics processing units may be designed to efficiently implement one or more kernels for the efficient execution of the steps of the OPC method described previously. In an implementation, graphics data are in the form of polygons. In an implementation, graphics data are in the form of rectangles.

In an implementation, the graphics processing units are programmed using traditional graphics APIs such as OpenGL or DirectX. In another implementation, the graphics processing units are programmed using APIs that are designed for more general purpose calculations such as Brook (from Stanford), CUDA (NVIDIA), or CTM (ATI). In modern graphics hardware there are unified shaders that can act as either vertex processors or pixel/fragment processors depending on the requirements of the application. These processors are referred to as stream processors under the General Purpose graphics processing unit (GPGPU) APIs and their usage is similar to what it would be under the graphics APIs but without any distinction between the different kinds of processors.

Typically, the following functions may be implemented with task level parallelism:

(i) Allocation of unified shaders or stream processors for evaluation point selection (step SD-1).

(ii) Allocation of unified shaders or stream processors for modification of evaluation points and their locations (step SD-3).

(iii) Allocation of rasterization for determining the evaluation points based on one-dimensional and two-dimensional cost functions (step SD-1).

(iv) Allocation of unified shaders or stream processors for intensity calculations using fast kernel lookups or fast kernel calculations (step SD-2).

(v) Allocation of fragment tests such as depth tests for area query and tagging of edges and edge fragments (step SD-2). Other examples of common fragment tests that may be used include scissor tests, alpha tests, stencil tests, blending tests, dithering tests, and logical operations. Other common fragment tests may also be used.

In a graphics processing unit, vertex shaders or vertex processors are a programmable unit that operates on incoming vertex values and their associated data. Rasterization is the conversion of both geometric and pixel data into fragments. Pixel shaders or fragment processors are programmable units that operate on fragment values and their associated data. For depth tests, for each pixel, the depth buffer keeps track of the distance from the viewpoint and the object occupying that pixel. Then, if the specified depth test passes, the incoming depth value replaces the value already in the depth buffer.

In current architectures unified shaders have replaced pixel and vertex shaders and are capable of performing the tasks of either one. The driver generally handles allocating how many of the unified shaders are to be used as vertex shaders and how many as pixel/fragment shaders at any one time. The term stream processor is used to refer to these same unified shaders but generally in the context of a general purpose graphics processing unit.

Typically, the following functions may be implemented with evaluation point parallelism also known as data-level parallelism:

(i) Unified shaders or stream processors compute one or more evaluation points in parallel (step SD-2).

(ii) Efficient use of four-dimensional pixel values or other layouts as appropriate for the architecture and pixel operations for fast kernel computation (step SD-2).

Typically, the following functions may be implemented with instruction level parallelism:

(i) Mapping of convolution tables as texture maps, image maps, or both (step SD-2).

(ii) Use of texture interpolation for optimizing texture cache use (step SD-2).

Texture maps or image maps are rectangular arrays of data (e.g., color data, luminance data, color and alpha data, and the like). Texture interpolation is mathematical interpolation between texture map or image map data.

The technique applies to rectangular, two-dimensional, and one-dimensional layouts. One-dimensional layouts are possible when using nVidia's CUDA architecture.

Typically, the following special hardware functions may be implemented for searching and region query:

(i) Depth processor for selection of evaluation points (step SD-1).

(ii) Single-input multiple-data (SIMD) video processor for computing error terms (step SD-3).

(iii) Multiple-input multiple-data (MIMD) video processor for computing error terms (step SD-3).

A depth processor is a programmable unit that operates on incoming fragment or pixel values and their associated data. A video processor is a processor that performs video decoding or encoding operations on video data. In an implementation, the processor is of a single-instruction multiple-data (SIMD). In another implementation, the processor is of a multiple-instruction multiple-data (MIMD) type.

Thus, a subset of OPC calculations maps very efficiently onto typical graphics processing unit hardware and typical graphics processing unit programming features. Therefore, graphics processing units may share computations with CPUs to more efficiently manage OPC problems leading to higher throughput, lower cost, improved efficiency, and the like.

In an implementation, the specific case illustrated uses an Nvidia® GeForce® graphics processing unit processor. The present invention may generally apply to any commercial graphics processing unit or similar device.

Trademarks are the property of their respective owners. Nvidia and GeForce are trademarks of Nvidia Corporation.

Various operations of an OPC flow are executed using a graphics processor. Some steps of an OPC flow include a geometric operation, polygon fragmentation, intensity calculation, area search, and placement error or EPE calculation. Geometric operations can be performed by a graphics processing unit. Polygon fragmentation operations can be performed by a graphics processing unit. Intensity calculations can be performed by a graphics processing unit. Area search can be performed by a graphics processing unit. Placement error or EPE can be performed by a graphics processing unit.

The graphics processor may be a single integrated circuit or multiple integrated circuits. For example, one or more of the graphics processing unit components may reside on a single integrated circuit. In another implementation, all of the graphics processing unit components reside on a single integrated circuit Or any combination of components may reside on one integrated circuit and other components reside on one or more other integrated circuits. Also a single integrated circuit may include one or more graphics processor cores.

In a graphics processor, there are one or more vertex processors, which are connected to a triangle setup block. A unified shader allocated as a vertex processor is responsible for running the vertex shaders. The input for a vertex shader may be vertex data, namely its position, color, normals, and so forth. In a vertex shader, code can be written for tasks such as: vertex position transformation using the model view and projection matrices; normal transformation, and if required its normalization; texture coordinate generation and transformation; lighting per vertex or computing values for lighting per pixel; and color computation.

The triangle set up block performs operations. The triangle set-up block is connected to a shader instruction dispatch. The shader instruction dispatch performs operations. The shader instruction dispatch is connected to one or more fragment processors.

Unified shaders acting as fragment processors are where the fragment shaders run. In an implementation, this unit is responsible for operations like: computing colors, and texture coordinates per pixel; texture application; fog computation; and computing normals if one wants lighting per pixel. The inputs for a fragment processor this unit are typically the interpolated values computed in the previous stage of the pipeline such as vertex positions, colors, normals, and so forth.

The fragment processor is connected to a fragment crossbar. The fragment crossbar performs operations. The fragment crossbar is connected to a stencil buffer. The stencil performs operations. The stencil is connected to one or more memory partitions.

The graphics processor may have one or more video processors. The video processor performs operations. The video processor is connected to other components. Any combination of the components shown in a graphics processor may be included in an integrated circuit. For example, a graphics processing unit integrated circuit may include a vertex processor unit and a fragment processor unit. The graphics processing unit integrated circuit may include a vertex shader unit and a stencil buffer unit.

The geometric operations and polygon fragmentation (step SD-1) may map to the vertex processor hardware blocks of the graphics processing unit. The intensity calculation, area search, and EPE calculation steps (steps SD-2 through SD-4) may map to the fragment processor and depth filter hardware blocks of the graphics processing unit. EPE calculation may simply be referred to as placement error calculations, especially in embodiments of the invention where edges are not used. In an implementation, at least one or more of these operations map to the stream processors of the general purpose graphics processing unit languages or APIs. In another implementation, all of these operations map to the stream processors of the general purpose graphics processing unit languages or APIs.

Geometric operations may be performed in the CPU (e.g., outside the graphics processing unit), vertex processors, fragment processors, or stream processors. Fragmentation operations may be performed in the CPU, vertex processors, fragment processors, or stream processors. Intensity calculations may be performed in the fragment processors or stream processors. Area search may be performed in the fragment processors, stream processors, or stencil. EPE calculations may be performed in the fragment processors, video processor, or stream processors. In an OPC procedure, any combination of these operations may be performed with each other.

For example, the fragment processor may perform the geometric operations, fragmentation operations, intensity calculations, area search, and EPE calculations. In another embodiment, the geometric operations and fragmentation operations may be performed by the CPU and the intensity calculations, area search, and EPE calculations may be performed in the graphics processing unit. In another embodiment, the geometric operations and fragmentation operations may be performed by the vertex processor of the graphics processing unit and the intensity calculations, area search, and EPE calculations may be performed by the fragment processor of the graphics processing unit. In an embodiment, one or more functions are executed on the stream processors of the graphics processing unit using a general purpose graphics processing unit language. In another implementation, all functions are executed on the stream processors of the graphics processing unit using a general purpose graphics processing unit language. In an implementation, the general purpose graphics processing unit language is CUDA. In an embodiment, the area search may be performed in the stencil buffer of the graphics processing unit. In another embodiment, the EPE calculation may be performed using the video processor. Positions of geometries of the layout may be represented in the four-dimensional space (RGBA) format provided in the graphics processing unit. In other words, a two-dimensional trapezoidal shape of the data is represented as four-channel data in the graphics processing unit. In specific implementations, the trapezoid may be a rectangle or square. In an embodiment, two opposite corners of a two-dimensional trapezoidal shape of the data is represented in a RGBA color space format in the graphics processing unit. For example, X1 will be R, Y1 will be G, X2 will be B, and Y2 will be A. The graphics processing unit will operate on the data stored in such a four-dimensional format.

In another embodiment, X- and Y-coordinates for a corner, a width, and a height of a two-dimensional trapezoidal shape of the data is represented in a RGBA color space format in the graphics processing unit. For example, X1 will be R, Y1 will be G, W will be B, and H will be A. The graphics processing unit will operate on the data stored in such a four-dimensional format.

In another embodiment, X- and Y-coordinates for a corner, a change in X, and a change in Y of a two-dimensional trapezoidal shape of the data is represented in a RGBA color space format in the graphics processing unit. For example, X1 will be R, Y1 will be G, delta X will be B, and delta Y will be A. The graphics processing unit will operate on the data stored in such a four-dimensional format.

In another embodiment, X- and Y-coordinates for a corner, an angle, and a scalar of a two-dimensional trapezoidal shape of the data is represented in a RGBA color space format in the graphics processing unit. For example, X1 will be R, Y1 will be G, theta will be B, and r will be A. The graphics processing unit will operate on the data stored in such a four-dimensional format.

In another embodiment, the data are stored as four separate one component textures or in the linear memory format exposed by CUDA.

In another embodiment, the polygons are not converted to trapezoids, and the data are stored as a list of vertices of each polygon. Neighborlists can be used to determine the interaction between sample points and polygons.

There representations of OPC data in a graphics processing unit are merely examples of some representations that may be used. In other embodiments of the invention, other representation schemes may be used.

In an embodiment, a system of the invention includes: a computing system having at least one central processing unit and at least one graphics processing unit; a user interface for interacting with the computer system; a computer readable medium including data describing the size and placement of features to be formed on a photolithography exposure mask used to manufacture semiconductor devices; a computer readable medium including optical proximity correction calculation procedures for acting upon the data, where at least a portion of the optical proximity correction calculation procedures are executed using the graphics processing unit; and output devices for displaying the results of applying the optical proximity correction calculation procedures executed using the graphics processing unit upon the data. The graphics processing unit may include a vertex processor unit and a fragment processor unit. The graphics processing unit may include a vertex shader unit and a stencil buffer unit.

In an embodiment, there may be multiple CPUs and graphics processing units that perform the OPC calculations. A system of the invention may include multiple nodes which are connected with a high speed interface or connections between them. This interface may include, for example, a PCI Express bus, AGP bus, front side bus, Ethernet, or the Internet, or a combination of these. Each node has one or multiple CPUs or one or more graphics processing units, or any combination of CPU and graphics processing units. Each node may or may not be equipped with a secondary storage area such as a hard disk floppy, CD writer, or other secondary storage. OPC software of the invention may be run on any of the machines.

For example, there may be a master program that runs on any subset of the nodes of the system. The master program may be executed on only one of the nodes. Data which OPC procedures of the invention will act upon may be associated with any node of the system. The master program may direct other nodes of the system to perform OPC calculations. The master program may coordinate operations of the computing system. The OPC procedures or data, or both, may be transferred from one node to any other node of the system. Results may then be passed back to the master program, where individual results are combined.

The graphics processing units and the optical proximity correction calculation procedures may include at least one of:

Procedures for allocation of unified shaders or stream processors for evaluation point selection.

Procedures for allocation of unified shaders or stream processors of evaluation points and their locations.

Procedures for allocation of rasterization for determining the evaluation points based on one-dimensional and two-dimensional cost functions.

Procedures for allocation of unified shaders or stream processors for intensity calculations including spatial or frequency-domain approaches to calculate intensity or electromagnetic fields, or a combination, in air or in the other media including resist materials and on a chip surface.

Procedures for allocation of unified shaders or stream processors for intensity and electromagnetic field calculations in air and in the resist material as well as other related locations on the chip surface including memory lookups or fast kernel calculations.

Procedures for allocation of unified shaders or stream processors for intensity calculations using other methods of calculating intensity or electromagnetic fields, or a combination, such as convolution in frequency domain using fast Fourier transforms and inverse Fourier transforms or any other transforms to the same effect in air or in the resist material as well as other related locations on the chip surface.

Procedures for allocation of unified shaders or stream processors for intensity calculations using fast kernel lookups or fast kernel calculations.

Procedure for allocation of unified shaders or stream processors for intensity calculations using light lookups or light calculations.

Procedures for allocation of depth filters for area query and tagging of edges and edge fragments.

Procedures for unified shaders or stream processors for computation of evaluation points.

Procedures for mapping of convolution tables as texture maps.

Procedures for the use of texture interpolation for optimizing texture cache use.

Procedures for the use of a depth processor for the selection of evaluation points.

Procedures for the use of a single input multiple data (SIMD) video processor for computing error terms.

In a specific embodiment of the present invention, a procedure splits the given layout information into two-dimensional subregions, where these regions overlap with each other. There may be multiple such procedures running on separate nodes of a system. This information, as well as whole or partial layout information, is sent to each node where the nodes perform at least one OPC-related calculation. The results of the calculation or calculations are collected (such as at a single node) where the information is stitched together by removing the overlapping regions. Stitching may be performed using a single node or multiple nodes in parallel.

In a specific embodiment, a procedure includes splitting a layout into a number of nonrectangular two-dimensional overlapping regions. The method splits the layout into overlapping two-dimensional rectilinear or polygonal spaces, sending whole or portions of the region or regions to each node. The method may perform OPC corrections (or reticle corrections) without sending or sharing any information between nodes. Portions or complete regional information may be provided to each node for parallel computation.

In a method or technique of the invention, instead of performing calculations on an entire layout, the layout is divided or partitioned into a number of subregions. In this case, each subregion is two-dimensional. In particular, a technique partitions a layout into a number of regions or subregions. Although each region is shown as been rectangular, each partition may have any shape such as square, trapezoid, any polygon, or other shape.

According to a specific approach, the data in each two-dimensional subregion is operated on by one or more computing nodes of the system. As discussed above, each node may include CPUs, graphics processing units, or both. In a specific implementation, each node has a graphics processing unit which performs OPC calculations on a specific subregion of the layout. Calculations may be performed on a number of subregions in parallel, which will speed up the calculations. Generally, the greater the number of nodes, the faster the calculations may be performed since more calculations will be performed in parallel. After a node has completed its calculations, the output results can be transferred back to a calling node (such as the node where a master program is running) or to another specific location. Then, one or more computing nodes will assemble the output results for the individual partitions together to provide the OPC calculation output for the complete layout data.

In a specific implementation of the invention, each subregion is sent to a node including some overlapping region data from adjacent partitions. For example, for a corner partition, a subregion sent to a node will include overlap information from two adjacent sides. For an edge partition (not corner), a subregion sent to a node will include overlap information from three adjacent regions. For a middle partition, the subregion will include overlap information from four adjacent regions. When performing the OPC calculations, the nodes will use these subregions including overlap data.

In a specific implementation, after the OPC calculations, the output from each node will be simply the output data for the subregion itself, without any overlap regions. In this case, each node may have the overlap region as the input data, but not in the output data. This approach may lead to more accurate results in the OPC calculations.

In a specific embodiment, the computation of the lithography process simulation for OPC and RET purposes which includes the mask preparation related calculations, EAPSM and AAPSM related calculations such as an electromagnetic field computation to take into account the thick mask effects, the chemical processes happening during lithography processes including the exposure process, the postbake process, the chemical amplification process, the development process all or partially computed in pixel shaders or in combination of pixel and vertex shaders.

In a specific embodiment, a lookup table for light computations is broken into subsections which allow the storage in fast user controlled memory such as a local store of the SPEs on IBM's CELL chip or other user controlled memory on graphics processing units.

In an embodiment, a computer system includes a server, display, one or more input interfaces, and one or more output interfaces, all conventionally coupled by one or more buses. In another embodiment, a computer system includes a server, display, one or more input interfaces, and one or more output interfaces, where at least one or more components are conventionally coupled by one or more buses. Some examples of suitable buses include PCI-Express®, AGP, PCI, and ISA. Other suitable buses may also be used.

The computer system may include any number of graphics processors. The graphics processor may reside on the motherboard such as being integrated with the motherboard chipset. One or more graphics processors may reside on external boards connected to the system through a bus such as an ISA bus, PCI bus, AGP port, PCI Express, or other system buses. Graphics processors may be located on separate boards, each connected to a bus such as the PCI Express bus to each other and to the rest of the system. Further, there may be a separate bus or connection (e.g., Nvidia SLI™ or ATI™ CrossFire™ connection) by which the graphics processors may communicate with each other. This separate bus or connection may be used in addition to or in substitution for system bus.

In an implementation, the server includes one or more CPUs, one or more graphics processing units, and one or more memory modules. Each CPU and graphics processing unit may be a single-core or multiple-core unit. Some examples of suitable CPUs include Intel® Pentium®, Intel Core™ 2 Duo, AMD Athlon® 64, and AMD Opteron™. Other suitable CPUs may also be used. Some examples of suitable graphics processing units include Nvidia GeForce® and ATI Radeon®. Other suitable graphics processing units may also be used. The input interfaces may include a keyboard and a mouse. The output interface 404 may include a printer.

The communications interface is a network interface that allows the computer system to communicate via a wireless or hardwired network. The communications interface may be coupled to a transmission medium (not shown). In an implementation, the transmission medium is a network transmission line, for example, twisted pair, coaxial cable, fiber optic cable, and other transmission line. In another embodiment, the communications interface provides a wireless interface, that is, the communication interface uses a wireless transmission medium. Some examples of other devices that may be used to access the computer system via a communications interface include cellular telephones, PDAs, personal computers. Other devices may also be used to access the computer system via the communications interface.

The memory modules generally include different modalities, illustratively semiconductor memory, such as random access memory (RAM), and disk drives as well as others. In various embodiments, the memory modules store an operating system, data structures, instructions, applications, and procedures.

Storage devices may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

In an embodiment, specific software instructions, data structures, and data that implement various embodiments of the present invention are incorporated in a computer or server. An embodiment of the present invention can be tangibly embodied using a computer readable medium, for example, the memory, and includes instructions, applications, and procedures which, when executed by the processor, causes the computer system to utilize the present invention, for example, the collection and analysis of data, pixelating structures, determining edge placement errors, moving edge fragments, optimizing edge fragment placements, and the like. The memory may store the software instructions, data structures, and data for any of the operating system, the data collection application, the data aggregation application, the data analysis procedures, and the like in semiconductor memory, in disk memory, or a combination of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media.

Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary machine-executable version of the software of the present invention may be stored or reside in RAM, cache memory, a mass storage device, or a combination of these. The source code of the software of the present invention may also be stored or reside on a mass storage device (e.g., hard disk, magnetic disk, tape, or CD-ROM). As a further example, code of the invention may be transmitted via wires, radio waves, or through a network such as the Internet.

The operating system may be implemented by any conventional operating system such as Windows® (registered trademark of Microsoft Corporation), Unix® (registered trademark of the Open Group in the United States and other countries), Mac OS® (registered trademark of Apple Computer, Inc.), Linux® (registered trademark of Linus Torvalds). Other operating systems not listed here may also be used.

The present invention may be implemented as a method, technique, system, or article of manufacture using standard programming or engineering techniques, or both, to produce software, firmware, hardware, or any combination of these. The term "article of manufacture" (or alternatively, "computer program product") as used in this application is intended to encompass a computer program accessible from any computer readable device, carrier, or media. In addition, the software in which various embodiments are implemented may be accessible through the transmission medium. For example, software may be accessible from a server over the network. The article of manufacture in which the code is implemented may also encompass transmission media, such as the network transmission line and wireless transmission media. The article of manufacture may also include the medium in which the code is embedded. Those skilled in the art will recognize that many modifications may be made to this configuration without departing from the scope and spirit of the present invention.

The computer system described in this application is not intended to limit the present invention. Other alternative hardware environments may be used without departing from the scope and sprit of the present invention.

This description of the invention has been presented for the purposes of illustration and description. It is not intended to be exhaustive or to limit the invention to the precise form described, and many modifications and variations are possible in light of the teachings above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

Section 3.3 Sample Claims
The invention claimed is:
1. A system comprising:
a computing system comprising at least one central processing unit and at least one graphics processing unit;
a user interface for interacting with the computer system;
a computer readable medium comprising data describing the size and placement of features to be formed on a photolithography exposure mask used to manufacture semiconductor devices;
a computer readable medium comprising optical proximity correction calculation procedures for acting upon the data, wherein at least a portion of the optical proximity correction calculation procedures are executed using the graphics processing unit; and
output devices for displaying the results of applying the optical proximity correction calculation procedures executed using the graphics processing unit upon the data.

2. The system of claim 1 wherein the graphics processing unit comprises a vertex processor unit and a fragment processor unit.

3. The system of claim 1 wherein the graphics processing unit comprises a vertex processor unit and a stencil buffer.

4. The system of claim 2 wherein the graphics processing unit further comprises a stencil buffer.

5. The system of claim 2 wherein the graphics processing unit further comprises a video processor unit.

The system of claim 1 wherein the graphics processing unit comprises a vertex processor unit, fragment processor unit, stencil buffer, and video processor unit.

7. The system of claim 1 wherein the graphics processing unit comprises unified shaders, a stencil buffer, and a video processing unit.

8. The system of claim 1 wherein the optical proximity correction calculation procedures are shared between the central processing unit and the graphics processing unit.

9. The system of claim 7 wherein the at least one graphics processing unit is replaced by at least one of a physics processor, cell processor, digital signal processor, or application specific integrated circuit.

10. The system of claim 1 wherein graphics processing units and the optical proximity correction calculation procedures comprise at least one of:
procedures for allocation of unified shaders or stream processors for evaluation point selection;
procedures for allocation of unified shaders or stream processors for modification of evaluation points and their location;
procedures for allocation of rasterization for determining the evaluation points based on one-dimensional and two-dimensional cost functions;
procedures for allocation of unified shaders or stream processors for intensity calculations including spatial or frequency-domain approaches to calculate intensity or electromagnetic fields, or a combination, in air or in the other media including resist materials and on a chip surface;
procedures for allocation of unified shaders or stream processors for intensity and electromagnetic field calculations in air and in the resist material as well as other related locations on the chip surface including memory lookups or fast kernel calculations;
procedures for allocation of unified shaders or stream processors for intensity calculations using other methods of calculating intensity or electromagnetic fields, or a combination of these, such as convolution in frequency domain using fast Fourier transforms and inverse Fourier transforms or any other transforms to the same effect in air or in the resist material as well as other related locations on the chip surface;
procedures for allocation of unified shaders or stream processors for intensity calculations using fast kernel lookups or fast kernel calculations;
procedures for allocation of unified shaders or stream processors for intensity calculations using light lookups or light calculations;

procedures for allocation of depth filters for area query and tagging of edges and edge fragments; procedures for unified shader or stream processor computation of evaluation points; procedures for mapping of convolution tables as texture maps;

procedures for the use of texture interpolation for optimizing texture cache use;

procedures for the use of a depth processor for the selection of evaluation points; or procedures for the use of a single input multiple data video processor for computing error terms.

procedures for splitting lookup table into pieces to increase data locality.

It is understood that the unified shaders could be used as either vertex or pixel shaders for these purposes although not always with equal efficiency.

11. The system of claim 1 wherein in intensity calculation procedures, area search procedures, and placement error calculation procedures of an optical proximity correction calculation procedure are executed using the unified shaders or stream processors of the graphics processing unit.

12. The system of claim 1 wherein in intensity calculation procedures, area search procedures, and optimization cost function calculations including edge placement error calculation procedures of an optical proximity correction procedure are executed using the unified shaders or stream processors of the graphics processing unit.

13. The system of claim 11 wherein geometric operation procedures of the optical proximity correction calculation procedure are executed using the central processing unit.

14. The system of claim 11 wherein geometric operation procedures of the optical proximity correction calculation procedure are executed using the unified shaders or stream processors unit of the graphics processing unit.

15. The system of claim 11 wherein geometric operation procedures of the optical proximity correction calculation procedure are executed using the unified shaders or stream processors of the graphics processing unit 16. The system of claim 11 wherein polygon fragmentation procedures of the optical proximity correction calculation procedure are executed using the central processing unit.

17. The system of claim 11 wherein polygon fragmentation procedures of the optical proximity correction calculation procedure are executed using the unified shaders or stream processors of the graphics processing unit.

18. The system of claim 11 wherein polygon fragmentation procedures of the optical proximity correction calculation procedure are executed using the unified shaders or stream processors of the graphics processing unit.

19. The system of claim 11 wherein geometric operation and polygon fragmentation procedures of the optical proximity correction calculation procedure are executed using the central processing unit.

20. The system of claim 1 wherein area search procedures of an optical proximity correction calculation procedure are executed using a stencil buffer of the graphics processing unit.

21. The system of claim 1 wherein placement error procedures of an optical proximity correction calculation procedure are executed using a video processor of the graphics processing unit.

22. The system of claim 1 wherein a two-dimensional trapezoidal shape of the data is represented as four-channel data in the graphics processing unit.

23. The system of claim 1 wherein X and Y coordinates for two opposite corners of a two-dimensional trapezoidal shape of the data are represented in a RGBA color space format in the graphics processing unit.

24. The system of claim 1 wherein X and Y coordinates for a corner, a width, and a height of a two-dimensional trapezoidal shape of the data are represented in a RGBA color space format in the graphics processing unit.

25. The system of claim 1 wherein X and Y coordinates for a corner, a change in X, and a change in Y of a two-dimensional trapezoidal shape of the data are represented in a RGBA color space format in the graphics processing unit.

26. The system of claim 1 wherein X and Y coordinates for a corner, an angle, and a scalar of a two-dimensional trapezoidal shape of the data are represented in a RGBA color space format in the graphics processing unit.

27. The system of claim 26 wherein the data are stored in multiple textures or the linear memory.

28. A method comprising:
providing at least one central processing unit and at least one graphics processing unit;
separating an optical proximity correction process into tasks depending on a type of computation required;
allocating the tasks of the optical proximity correction process to the central processing unit or the graphics processing unit; and
delivering output of the central processing unit and the graphics processing unit as a result of the optical proximity corrections process.

29. The system of claim 28 wherein the graphics processing unit comprises a vertex processor unit and a fragment processor unit.

30. The system of claim 28 wherein the graphics processing unit comprises a vertex processor unit and a stencil buffer.

31. The system of claim 29 wherein the graphics processing unit further comprises a stencil buffer.

32. The system of claim 29 wherein the graphics processing unit further comprises a video processor unit.

33. The system of claim 28 wherein the graphics processing unit comprises a vertex processor unit, fragment processor unit, stencil buffer, and video processor unit.

34. The system of claim 28 wherein the graphics processing unit comprises a unified shader architecture, stencil buffer, and video processing unit.

35. The method of claim 28 wherein the at least one graphics processing unit is replaced by at least one of a physics processor, cell processors, digital signal processor, or application specific integrated circuit.

36. The method of claim 28 wherein the allocating the tasks comprises at least one of:
allocating unified shaders or stream processors for evaluation point selection;
allocating unified shaders or stream processors for modification of evaluation points and their locations;
allocating rasterization for determining the evaluation points based on one-dimensional and two-dimensional cost functions;
allocating unified shaders or stream processors for intensity calculations using fast kernel lookups or fast kernel calculations;
allocating unified shaders or stream processors for intensity calculations using light lookups or light calculations;
allocating depth filters for area query and tagging of edges and edge fragments;
using unified shaders or stream processors for computation of evaluation points;
mapping of convolution tables as texture maps;

using texture interpolation for optimizing texture cache use;
using a depth processor for the selection of evaluation points;
or
using a single input multiple data video processor for computing error terms.

37. A system comprising:
a computing system comprising a plurality of nodes, wherein each node comprises at least one of
at least one central processing unit or at least one graphics processing unit;
an interface to couple the plurality of nodes together;
a user interface for interacting with the computer system;
a computer readable medium comprising data describing the size and placement of features to be formed on a photolithography exposure mask used to manufacture semiconductor devices; and
a computer readable medium comprising optical proximity correction calculation procedures for acting upon the data, wherein at least a portion of the optical proximity correction calculation procedures are executed using the graphics processing unit in one of the nodes.

38. The system of claim 37 wherein the interface comprises at least one of a PCI Express bus, AGP bus, front side bus, Ethernet, or the Internet.

39. The system of claim 37 wherein the computer readable medium comprising data describing the size and placement of features to be formed on a photolithography exposure mask used to manufacture semiconductor devices is directly coupled to one of the plurality of nodes and a portion of the data are passed through the interface to at least one other node.

40. The system of claim 37 wherein the computer readable medium comprising optical proximity correction calculation procedures for acting upon the data is directly coupled to one of the plurality of nodes, and at least a portion of the optical proximity correction calculation procedures are executed using the graphics processing unit on a different node from which the optical proximity correction calculation procedures are directly coupled.

41. The system of claim 37 wherein the computer readable medium comprising optical proximity correction calculation procedures for acting upon the data is directly coupled to one of the plurality of nodes, and at least a portion of the optical proximity correction calculation procedures are executed using the graphics processing unit of the node to which the optical proximity correction calculation procedures are directly coupled.

42. The system of claim 37 comprising:
a computer readable medium comprising optical proximity correction calculation procedures to split given layout information into two-dimensional subregions, where at least two subregions overlap with each other.

43. The system of claim 42 comprising:
a computer readable medium comprising optical proximity correction calculation procedures to transfer the given layout information split-up into two-dimensional subregions to two or more nodes; and
a computer readable medium comprising optical proximity correction calculation procedures executing on the two or more nodes to operate on the given layout information split-up into two-dimensional subregions.

44. The system of claim 43 comprising:
a computer readable medium comprising optical proximity correction calculation procedures to combine results from a first node and a second node on the given layout information split-up into two-dimensional subregions.

45. The system of claim 44 wherein the optical proximity correction calculation procedures to combine results comprises stitching together the results by removing the overlapping regions.

46. The system of claim 45 wherein the stitching is performed by a single node.

47. The system of claim 45 wherein the stitching is performed by multiple nodes.

Section 3.4. Abstract

Optical proximity correction techniques performed on one or more graphics processors improve the masks used for the printing of microelectronic circuit designs. Execution of OPC techniques on hardware or software platforms utilizing graphics processing units. Graphics processing units may share the computation load with the system CPUs to efficiently and effectively execute the OPC method steps.

Section 4 A Graphics Processing Unit-Based Full-Chip Inverse Lithography Solution for Random Patterns Section 4.1 Abstract An inverse lithography solution based on optimization is presented. An optimization approach operates as an inverse lithography tool, based on modeling and simulation of the manufacturing process. Given the associated computational requirements, the proposed solution intentionally uses graphic processors or graphics processing units as well as CPUs as computation hardware. The results are optimized towards manufacturability and process window maximization.

Section 4.2 Keywords

Optimization, Graphics processors, Inverse Lithography, Computational Lithography, Full-Chip, Feedback Control Section 4.3 Introduction In semiconductor manufacturing, software simulations and correction tools have been used for the past several years to minimize lithography-related yield loses and to improve printability. As the feature sizes of on-chip structures shrink, the physics of the lithographic process become highly complex and traditional OPC methods do not produce satisfactory results.

Studies on inverse lithography technology (ILT) have usually resulted in superb lithography. To date, though, ILT implementations in a production environment have, in general, proved impractical due to issues such as intractably long computer run-times and nonmanufacturable mask designs. Due to the unrealistic computational requirements, utilization of current ILT methods has been limited to processing small portions of layouts. In addition, the ill-conditioned behavior of high fidelity process models, commonly utilized in traditional OPC, makes it hard to use with ILT. This has been a factor to use an approximation for the inverse lithography, limiting accuracy. Approaches that handle mask manufacturability constraints after a mask has already been synthesized are inherently prone to nonmanufacturable or suboptimal results. Pixel-based approaches are ILT methods. Their computational and memory requirements are proportional to the grid density. Since the sufficient computational resources have not existed, these solutions generally sacrifice fidelity for run-time.

A microlithography process used in a manufacture of chips can be a projection process using a fixed monochromatic light source. An aim of this operation is to print an exact copy of the desired two-dimensional pattern, called a layout, L, onto a wafer (usually scaled by 4×). The light source shines light through a mask, M, and exposes an image on a wafer (bottom of the image) covered with light sensitive material, called photoresist. The mask, M, carries the two-dimensional information about the desired pattern. In the non-diffraction-limited case, the mask is very similar to the original layout, L (in an ideal case, it is a 4× bigger version of the layout L).

After a prescribed exposure, called the dosage, an image of the features in the mask is formed in the photoresist material by photo-chemically altering the properties of the material. To generate the pattern, the wafer goes through a development step where the exposed resist is removed from wafer and the unexposed areas remain. The contours (boundaries) are expected to match the desired shapes in layout, L.

As feature sizes of on-chip structures shrink, the fundamental physical limits of traditional lithography impact design performance. Below 180 nanometers, the size of on-chip elements falls below the 193-nanometer wavelength of light used to print those elements on silicon. At these sub-wavelength dimensions, the light passing through the diffraction-limited projection system, as well as the properties of the resist and the development process, result in a severe distortion of the patterns printed on the silicon compared to those created by the designer. Distortion effects impact pattern fidelity and, in a worst case, can even eliminate patterns entirely. Even relatively slight pattern distortions can result in non-functioning silicon. Consequently, manufacturers have resorted to applying corrections; otherwise, designs will experience large yield losses due to inaccurate image replication.

Toward this end, silicon foundries are beginning to augment traditional computational lithography techniques with additional capabilities. Recently, a promising new approach, Inverse Lithography Technology (ILT), has caught the attention of semiconductor manufacturers. It has long been thought that the best theoretically possible mask design can be achieved by considering the design of masks as an inverse problem. That is, to find an optimal mask for a given process, solve the inverse problem using a rigorous mathematical approach.

FIGS. 4.1a-4.1b show an example of such modifications made to the mask. FIG. 4.1a shows a simple original layout of a circuit before ILT processing. The figure shows the desired pattern.

FIG. 4.1b shows the simple original layout in FIG. 4.1a after ILT processing. The figure shows synthesized masks to generate an output that is as close as possible to the desired pattern. That is, the mask geometry is modified as needed until the simulator produces the desired contours on the surface of the wafer. Arrow 412 shows an inserted feature: positive SRAF, and arrow 416 shows an inserted feature: negative SRAF.

Previous methods developed to date are impractical in a production environment, due to intractable run-times, nonmanufacturable masks, or both. Recently, some commercialization effort has been done, but to date, a great number of ILT implementations in a production environment have proved impractical for random logic circuits due to intractably long computer run-times and, as a consequence, the use of computational shortcuts that jeopardize converging to an optimal solution.

Nevertheless, ILT demonstrations have usually resulted in superb lithography. Despite the practical limitations, the masks generated generally result in superior accuracy and better pattern fidelity.

Section 4.4 Selection of Computational Platform

Today some fabrication houses employ CPU clusters comprising several hundred to several thousand processors as a part of their current computational lithography requirements. A practicable ILT solution should not require more than this many processors. A comparison of commonly employed computational hardware platforms in suggests that graphics processing units would be the best choice for computational lithography-related modeling and simulation tasks.

Unfortunately, graphics processing unit programming is in its infancy, requiring specific algorithms developed for a given problem (e.g., there is no universal tool that compiles a given sequential technical computing software for graphics processing unit hardware). For each given problem, graphics processing unit-specific algorithms, utilizing the parallelism in the hardware, are developed to achieve an attractive performance advantage. A fundamental reason for this is that legacy algorithms are sequential (e.g., serial) in nature and originally written for a latency-centric CPU implementation. On the other hand, graphics processing units are highly parallel processing engines and require different algorithms. By utilizing specialized hardware, such as the texture interpolators, as well as critical data organization techniques selected to maximize locality to leverage the multi-cache graphics processing unit memory architecture, we have been able to utilize the 4 TFLOP compute power of graphics processing units of the type found in a commodity desktop computer for lithography-related computations.

Section 4.5 The Forward Path: Process Simulation

In an implementation, to estimate printed contours, the software simulates one or more steps of the printing process, including exposure and resist development. The parallelized graphics processing unit implementation can be used for this forward path (lithography system modeling) and a CPU-graphics processing unit implementation of the optimization algorithm can be used in the feedback loop. The following section briefly explains the models used to perform this task. In another implementation, to estimate printed contours, the software simulates all steps of the printing process, including exposure and resist development.

First, the simulator runs with a given mask and projection lithography settings. A two-dimensional intensity map of the absorbed energy in the photoresist is generated. Next, using the two-dimensional intensity map, an etching process is simulated to determine how at least one pattern will print and where the contours (e.g., the boundary between the fully-dissolved photoresist and the un-dissolved resist material) will form. The difference between the as-produced contours and the desired contours is used to compute the fidelity, or error norm, of the mask.

Section 4.5.1 Modeling

In an implementation, a lithography process simulator models more physical phenomena than before to accurately capture the salient features that are utilized for the advanced nodes.

Modeling the Optics: Mask-related issues and an image on or inside the photo sensitive layer over the wafer (resist) can be modeled using a closed form integration given using Hopkins formulation. A main idea is to convert the equations into a four-dimensional convolution between the transfer function of an optical system with a mask function, M, where TCC(f, g, f', g', f", g") is a band limited function, dependent on lithography settings including the Numerical Aperture (NA), collection angle, light source coherence and light source shape.

Process Modeling: A process model simulates processing steps done to generate contours on a wafer surface. In-resist (latent) image calculation is used, which accounts for defocus and high NA effects. The post-exposure bake model models acid and base reactions separately. A density-based development model is employed, which accounts for development rate change with density. Similarly, a light slope-based development model is used to account for line-end shortening. To account for wafer etch effects, a model a density and solid angle-based model is used that contains a constant term, sum of Gaussian functions, and an ion projection term.

Mask Modeling: A model uses three-dimensional mask (thick-mask) effects approximating more accurate Electro-Magnetic Field (EMF) solvers using domain decomposition based approaches. The Gaussian rounding-based model includes mask manufacturing effects such as corner rounding and offset.

Section 4.5.2 Computational Complexity of the Forward Simulation

A typical requirement for the nodes beyond 45 nanometers may be that the lithography simulator should generate outputs at sampling points of 1/20 of a wavelength to capture requisite variations. For advanced nodes such as 22 nanometers, this corresponds to a 6-7 nanometer sampling size. Considering a chip of size 25 mm×25 mm, a total number of sampling points where output data should be calculated can be $17 \times 10^{12}$. For a conservative 16-kernel Hopkins light intensity calculation, and very efficient convolution of the order $5N \times \log_2(N)$, a computational complexity is approximately $16 \times 5 \times 17 \times 10^{12} \times \log_2(17 \times 10^{12}) \sim 10^{17}$ floating point operations. If implemented on a high performing CPU available today, with a very efficient convolution implementation, a performance is about $5 \times 10^9$ flops/second. Therefore, a total time for a single-core CPU is $(10^{17})/(5 \times 10)=2 \times 10^7$ seconds. Even with a 1000-CPU core cluster, this number is 6 hours. In an implementation, when employing an iterative mask synthesis or correction algorithm, these computations are repeated in every step. If an ILT optimization loop requires 100 iterations for convergence, just the forward path simulation would take 600 hours. Any additional phenomena, such as latent image generation, and process model, further increase the computational complexity.

Section 4.6 The Feedback Path: An Optimization-Based Mask Synthesis Method

The mask synthesis process described here can be treated as an optimization problem. That is, based on the modeling given above, a mask synthesis problem can be converted into a constraint minimization problem. As indicated earlier, the feedback loop, designed around the forward litho simulation path, is to modify the mask such that the printed image is as close as possible to the desired image.

FIG. 4.2 shows a specific flow of an ILT optimization loop to generate an inverse model. In a step 420, a light source is provided. In a step 424, the light source shines light through a mask and exposes an image on a wafer covered with light sensitive material. The mask carries information about a desired image 428. In a step 432, equations are converted into a four-dimensional convolution between the transfer function of an optical system with a mask function, M. In a step 436, a process model simulates processing steps done to generate contours on a wafer surface.

Section 4.6.1 Mask Synthesis Method

In an implementation, a mask synthesis is done in four stages using an error norm, as part of a feedback loop. A specific implementation of stages is presented in this patent, but it should be understood that the invention is not limited to the specific stages, flow, or steps presented. A flow of the invention may have additional stages (not necessarily described in this application), different stages which replace some of the stages presented, fewer stages, or a subset of the stages presented, or stages in a different or alternative order than presented, or any combination of these. Certain stages may be repeated as needed. Further, the stages in other implementations of the invention may not be exactly the same as the stages presented and may be modified or altered as appropriate for a particular application or based on the circumstances.

In a first stage, a pixelized mask M, is synthesized. In an implementation, each pixel's transparency varies continuously between an $m_0$ and $m_1$, where $m_0$ is a lower boundary for a final pixel value and $m_1$ is an upper boundary for the final pixel value.

In a second stage, $M_c$ is converted to $M_{mid}$. In an implementation, $M_c$ is converted to $M_{mid}$ by pushing the pixel values towards either $m_0$ or $m_1$, but not exactly set to either $m_0$ or $m_1$ yet. During this process, a new cost function including initial terms and secondary binarization terms may be used.

In a third stage, an almost binary $M_{final}$ is generated from $M_{mid}$ by using a binary cost function.

In a fourth stage, the almost-binary $M_{final}$ is clipped to generate a binary function which minimizes $F_{tot}$ (more details below).

Section 4.6.2 Optimization Strategy

In an implementation, in each stage of the mask synthesis, at least one proper learning algorithm is employed. In an implementation, proper learning algorithms such as conjugate gradient or steepest descent based optimization algorithms are employed. A search space is selected as complex Fourier coefficients of a mask, M. These values are modified through finding the impact of each of these coefficients.

During a line search, frequencies of the mask are changed by computing a first derivative of a cost function. In an implementation, an initial condition selected for the optimization section changes from stage to stage. In a first stage, a low-pass filtered version of a desired layout L is selected as the initial condition. For a second and third stage, a result from the previous stage has been used as the initial condition.

An overall fitness function $F_{total}$: In an implementation, at each stage of the optimization, a following cost function is used to determine a fitness of any given mask, M.

$$F_{total}=(1-\eta)F_{cont}(M)+\eta F_{binary}(M,M_c)+F_{mask}(M) \quad (1)$$

where $F_{cont}$ is a continuous mask transmission fitness function and can be used to compute how well contours generated from mask M fit to target layout L. In an implementation, this function has several components. To account for effects of process conditions during the optimization, error (fitness) of mask M is computed in four focus-exposure conditions and at nominal (ideal) conditions and their effect is combined with different weights, $F_{binary}$ is a binary fitness function and can be used to binarize the mask. After the initial phase of the optimization, which produces the continuous transmission mask Mc, the optimization loop starts binarizing continuous mask Mc. This can be achieved by drifting a transmission value of each pixel based on a warp function. For each pixel value, this center peak has been adjusted at the beginning of the binarization stage. This function has two important properties:

(1) it is a continuous and differentiable function, and
(2) the transmission numbers are bounded.

$F_{mask}$ is a mask fitness function, and can be used to complete the binarization process. During the optimization, since the transmission of each pixel is modified, these values can go below minimum value $m_0$ and beyond maximum value $m_1$. Although this produces a solution, this infeasible solution is expected to be far from the feasible binary solution which then produces a suboptimal result. In an implementation, to prevent this from happening, an $F_{mask}$ function finds pixels which have transmission values bigger than $m_1$ or smaller than $m_0$ and computes the sum of the squared differences. In an implementation, the $F_{mask}$ function finds all pixels which have transmission values bigger than $m_1$ or smaller than $m_0$ and computes the sum of the squared differences. In other words, it computes a distance measure where each individual pixel can be viewed as a dimension by using the following equation:

$$F_{mask}(M) = \Sigma\Sigma \Gamma_{tr}(M(x,y))^2 \quad (2)$$

where $\Gamma_{tr}$ is the transmission distance, defined by $$\Gamma_{tr}(M(x,y)) = \begin{cases} f_1(M, x, y, m_0, m_1), & \text{if } m_0 < M(x,y) < m_1 \\ f_2(M, x, y, m_0, m_1), & \text{if } m(x,y) < m_0 \end{cases} \quad (3)$$

$f_3(M,x,y,m_0,m_1)$, if $m(x,y) < m_0$

As discussed earlier, for advanced-node devices the forward path lithography simulations alone require enormous computational horsepower. An optimization loop, as described above, adds to this requirement. Therefore, from a practicability perspective, utilizing the available 1000 GFLOP computational horsepower per graphics processing unit is a very attractive option compared to that of a single-core CPU of 20 GFLOP.

Section 4.7 Experimental Results and Conclusions

To demonstrate the efficacy of this approach, random logic standard cell layouts as well as repetitive structure memory designs were utilized. With a repetitive SRAM example we emphasize preserving certain properties of an original design while generating an inverse mask, finding similar patterns and applying similar ILT for consistency reasons. As an option, the approach has the capability to obey the built-in hierarchy definitions.

Similarly, an objective for selecting random logic designs is to demonstrate a full-chip processing power of the approach which generates the ILT results for every individual feature.

Section 4.7.1 Full-Chip Cases

Section 4.7.1.1 Random Logic Experiments with Flattened Designs

The particular random logic layout we report here is a 45 nanometer design. The 10 mm×10 mm chip was partitioned into smaller tiles of size (15360 nanometers×15360 nanometers). The stepper and process conditions are, the wavelength, $\lambda=193$ nanometers, NA=1.35, light source: C-quad with $\sigma_{in}=0.53$, $\sigma_{out}=0.98$, 200, defocus: ±100 nanometers, and 5% intensity variation.

In a specific implementation, we ran this layout on our 17-graphics processing unit farm containing 17 Intel CPU cores, 17 Nvidia GTX 295 graphics processing units, 16 GB main memory and 1 TB hard disk drive on each desktop, running under Linux Open Suse 11.1 operating system. Stage 2 bottom-up hierarchical data processing was used. The ILT processing of this full-chip took 122.4 hours. Given the linear scaling feature of our solution, it would use a "200 graphics processing unit+200 CPU-core" computer cluster to complete the task overnight, e.g., less than 12 hours.

Section 4.7.1.2 Random Logic Experiments with Hierarchical Data Processing

To study the additional speed improvements due to the hierarchical data processing we enabled this feature and recorded the processing speeds. Random logic pattern of size (10 millimeters×10 millimeters), with hierarchical data processing capability with both top-down and bottom-up stages enabled, took 22.3 hours on the abovementioned 17 graphics processing unit cluster, e.g., a 5.4 times faster processing.

Section 4.7.1.3 Repetitive Structure Experiments

The studies we conducted under Section 4.7.1.2 represent one of the slowest possible runtimes. The speed improvements due to the data hierarchy are highly layout (repetition) dependent. For the case we report in FIG. 4.3, for example, when both top-down and bottom-up stages enabled, the ILT processing was 8.3 times faster compared to the flattened case.

FIGS. 4.3A-4.3F show several random logic and repetitive structure full-chip cases. FIG. 4.3A shows a carve-out from an original random logic implementation of a standard cell. FIG. 4.3B shows the layout of the standard cell in FIG. 4.3A after the ILT processing. FIG. 4.3C shows a smaller portion of the layout of the standard cell in FIG. 4.3A for a better view. FIG. 4.3D shows the layout of FIG. 4.3C after the ILT processing. FIG. 4.3E shows a carve-out from the original SRAM layout. FIG. 4.3F shows the layout of FIG. 4.3E after the ILT processing.

Section 4.7.2 Small-Area Cases

FIGS. 4.4A-4.4F show a specific progression of an optimized process illustrated for a simple layout. In the figures, the representative layout has been used to illustrate the progression of the mask synthesis optimization scheme.

FIG. 4.4A shows a target layout. FIG. 4.4B shows a continuous-tone/continuous-shape mask after a first stage. FIG. 4.4C shows a still continuous tone mask, synthesized after binarizing in a second stage. FIG. 4.4D shows the mask synthesized after a third stage. FIG. 4.4E shows the synthesized binary mask after a fourth stage. FIG. 4.4F shows the target and wafer contours superimposed after the fourth stage.

In an implementation, a particular layout is of size (3591 nanometers×2598 nanometers), using 32 kernels at the wavelength, $\lambda=193$ nanometeres, and NA=1.35 used 173 seconds processing time with the 1 graphics processing unit+1 CPU-core desktop computer.

Section 5 An Advanced Modeling Approach for Mask and Wafer Process Simulation

Section 5.1 Abstract

A new modeling technique or method to accurately represent mask and wafer process behavior is presented.

In an implementation, a lithography simulation can be done in three steps: (1) mask simulation, (2) latent image calculations, and (3) resist process simulation. Leading edge designs, such as 32 nanometers and beyond (smaller dimensions than 32-nanometer technology), require higher-fidelity models to adequately represent each of these actual processes. The effects that are previously considered secondary have become more pronounced at the advanced technology nodes.

Mask distortion issues, due to the limitations in manufacturing, can be modeled ahead of time and can be included in a design of layouts to achieve a better optimization. In an implementation, a mask model has two main components: material and manufacturing effects. For the material effects, EMF-grade solvers perform well but computational requirements are heavy. Similarly, the manufacturing effects are approximated to a certain degree. In the present invention, an adaptive nonlinear mapping algorithm models remaining effects that are not modeled by existing approximations.

Wafer distortions may be due to limitations in an optical system, as well as to properties of the resist and development process. Among the various effects, the post exposure bake and development process model mismatches, once considered negligible, need to be addressed even for the OPC tasks for the advanced nodes.

In an implementation, a modeling approach combines two components: physical models and nonlinear mappers. To model physical phenomena, separate models may be used.

For the behavior that is not completely captured by these physical models, an adaptive nonlinear mapping algorithm can be developed and used.

In an implementation, physical model parameters are calibrated by a genetic algorithm. Nonlinear mapper model parameters are identified by a gradient descent method. The present invention will demonstrate an improvement using real process data.

Given the computational requirements for a practical solution, graphics processors as well as CPUs are used as computation hardware.

Section 5.2 Introduction

Lithography simulation can be done in three steps: (1) mask simulation, (2) latent image calculations, and (3) resist process simulation. The leading edge designs, such as 32 nanometers and beyond, require higher-fidelity models to adequately represent each of these actual processes. Effects that were previously considered secondary have become more pronounced at the advanced technology nodes.

Section 5.3. The Physical Models for Mask Modeling

Mask distortion issues, due to the limitations in manufacturing, can be modeled ahead of time and can be included in a design of layouts to achieve a better optimization. In an implementation, a mask model has two main components: material and manufacturing effects. For the material effects, EMF-grade solvers perform well but computational requirements are heavy. Similarly, the manufacturing effects may be approximated to a certain degree. In the present invention, an adaptive nonlinear mapping algorithm is presented that models the remaining effects that are not modeled by the existing approximations.

Mask Modeling

A physical model can use three-dimensional mask (thick-mask) effects approximating more accurate Electro-Magnetic Field (EMF) solvers using domain decomposition based approaches. Also included is the Gaussian rounding-based model for various mask manufacturing effects such as corner rounding and offset. A thick-mask effects simulator can be designed to handle any type of binary, chromeless, or attenuated phase shift with programmable attenuation masks.

Section 5.4. The Physical Models for Wafer Processing

Wafer distortions may be due to limitations in an optical system, as well as to properties of the resist and development process. Among various effects, the post exposure bake and development process model mismatches, once considered negligible, need to be addressed even for the OPC tasks for the advanced nodes.

To estimate printed contours, the software simulates one or more steps of the printing process. In an implementation, this includes exposure and resist development. A parallelized graphics processing unit implementation for this forward path (lithography system modeling) and a central processing unit (CPU)-graphics processing unit (GPU) implementation of the optimization algorithm used in the feedback loop can be used. The following section briefly explains the models used by the Gauda Lithography Simulator (GLS) to perform this task. All Gauda manuals including users' manuals and other product information is incorporated by reference.

First, a simulator runs with a given mask and projection lithography settings. Two-dimensional intensity maps of an absorbed energy in a photoresist are generated at various slices. Using the two-dimensional intensity maps, an etching process is simulated to determine how patterns will print and where contours (e.g., a boundary between a fully-dissolved photoresist and an undissolved resist material) will form. A difference between the produced contours and the desired contours is used to compute the fidelity, or error norm, of the mask.

Section 5.4.1. Modeling the Optics

An image due to a given mask on or inside a photo sensitive layer over a wafer (resist) can be modeled using a closed form integration using the Hopkins formulation. A main idea is to convert the equations into a four-dimensional convolution between a transfer function of an optical system with a mask function, M. In order to eliminate irregularities in a light source, Kohler based illumination can be used in an optical path. Imaging characteristics of the light passing through the mask, M, are described with a double integration. That is, Hopkins showed that the light intensity, I(f,g), a normed square of the electric field, E, can be calculated as:

$$I(f,g)=|E(f,g)|^2=\iint TCC(f+f',f'';g+g',g'')M(f-f',g+g')M^*(f',g')df'dg' \quad (1)$$

where TCC(f, g, f', g', f'', g'') is a band limited function, dependent on lithography settings including the Numerical Aperture (NA), collection angle, light source coherence and light source shape. A finite size of the collection lens means it can only collect the frequency components of the light up to a finite limit. This allows the system to be modeled by a low-pass filter whose cutoff frequency is $\lambda$/NA, where $\lambda$ is the wavelength of the light source.

Section 5.4.2. Process Modeling

A process model can simulate processing steps to generate contours on a wafer surface. In an implementation, a threshold model is used. In the simplest form, a threshold model, a point is considered dissolved if the light intensity at that point exceeds the threshold value. In an implementation, a more sophisticated model applies a sum of Gaussian blurring to simulate an impact of several processing steps and applies a variable threshold function based on the intensity, its derivatives and also mask density. An in-resist (latent) image calculation is used which accounts for defocus and high NA effects. A post-exposure bake model represents acid and base reactions separately. In an implementation, a density-based development model is employed which accounts for development rate change with density. In an implementation, a light slope-based development model is also used to account for line-end shortening. To simulate the postexposure bake process, a model that separately accounts for acid and base diffusion is used.

$$S(x,y)=(I_l(x,y)\odot G(0,\sigma_{acid}))+\beta(L(x,y)\Theta G(0,\sigma_{base}))-\beta \quad (2)$$

where S(x, y) is a solvent distribution, G(0,$\sigma$) is a two-dimensional Gaussian distribution, $I_l$(x,y) is a latent image intensity at a given depth, z, $\beta$ is a base percentile with respect to a maximum solvent concentration, and $\odot$ represents a convolution operation. A development model can use the solvent distribution to determine areas where the resist material is left. The remaining resist material thickness at a given point, $\rho$(x, y), can be determined as:

$$\rho(x,y)=t_d\xi(S(x,y)) \quad (3)$$

where $t_d$ is a development time and $\xi$( ... ) is a development rate. Even though the actual development rate changes non-linearly with solvent, the remaining resist material thickness can be represented as:

$$\rho(x,y) = t_d\zeta(S(x,y)) + t_d C_d L_d(x,y) + t_d C_\delta\left(\frac{\partial}{\partial x}+\frac{\partial}{\partial y}\right)I_l(x,y) \quad (4)$$

where $C_d$ is a development rate change with respect to density, $C_\delta$ is a development rate change with respect to gradient of latent image, $L_d(x, y)$ is a circuit layout density, and $\xi(\ldots)$ is a linear development rate function.

To account for wafer etch effects, a density and solid angle-based model can be used that contains a constant term, sum of Gaussian functions, and an ion projection term. The ion projection term can be the most significant term in the model representing the nonlinear etch bias.

Section 5.5. Neural Networks for Nonlinear Mapping

Neural networks can be used in engineering to mimic the parallelism and massive interconnectivity in the human brain. Towards building a computation mechanism based on neural networks, it is helpful to understand the structure of the brain. It is estimated that the human brain has over $10^{11}$ neurons. These neurons receive incoming signals from other neurons through a matrix of connection weights called the synapses. The neural dynamics are mainly determined by this connection matrix and in many instances it is necessary to change the connection strengths to facilitate new functions of the network. This changing phase is called learning.

The artificial neural networks are a simplified representation of this behavior to model engineering systems. FIG. 5.1 shows a basic neural network structure. FIG. 5.1. shows inputs nodes, an input layer, hidden nodes, an output layer, and an output node. In the figure, $x_i$ are input signals, $t_{ij}$ are weights of the link connecting node i to node j, and $w_j$ are weights of the output layer.

The incoming signals are propagated to the output node by using the following calculations. The inputs to the hidden nodes are weighted by the input layer as:

$$u_1 = t_{11}x_1 + t_{21}x_2 + \ldots t_{L1}x_L$$

$$u_2 = t_{12}x_1 + t_{22}x_2 + \ldots t_{L2}x_L$$

$$\ldots$$

$$u_N = t_{1N}x_1 + t_{2N}x_2 + \ldots t_{LN}x_L$$

$$\text{Or, } u_j = \sum_{j=1}^{N} t_{ij}x_i; j = 1, 2, \ldots, L.$$

For a static nonlinear mapping function, an output of a hidden node can be obtained by using a sigmoid function. FIG. 5.2 shows a graph of a sigmoid function.

$$\alpha_i = f(u_i) = \frac{2}{1 + e^{-(u_i + \theta_i)}} - 1$$

Then a final output signal, y, is calculated by using weights of the output layer as $$y = \sum_{j=1}^{N} w_j \alpha_j$$

Adaptation by Using Gradient Descent

Given input output training data, the weights can be adjusted to represent a nonlinear mapping between these two sets of data, provided that the neural network is designed to approximate to a required accuracy.

A gradient descent learning algorithm to minimize an error $$E_t = \frac{1}{2}(y_d - y_t)^2.$$

FIG. 5.3 shows an overall process modeling system architecture.

In FIG. 5.3, an adaptation error can be designed if the weights are updated as $$w_{new} = w_{old} - \mu \frac{\partial E_t}{\partial w}$$

where $y_d$ is a desired output, $y_t$ is a total model output, and $\mu$ is an adaptation step size.

Weight update equations for w and t can be found by considering that $$\frac{\partial E_t}{\partial w_j} = -e \frac{\partial y}{\partial w_j} = -e\alpha_j; \frac{\partial E_t}{\partial t_{ij}} = \frac{\partial E_t}{\partial u_j} \frac{\partial u_i}{\partial t_{ij}};$$

and $$\frac{\partial f(u_j)}{\partial u_j} = \frac{1}{2(1 - \alpha_j^2)}.$$

Section 6 Adaptive Sampling and Fragmentation Algorithms for Optical Proximity Correction Section 6.1. Abstract Adaptive optical proximity correction algorithms improve computational efficiency and complexity mask design for a target accuracy. Further, these adaptive algorithms can involve strictly local operations making it ideally suited for SIMD (single instruction multiple data) parallel hardware such as graphics processing units (GPU).

Section 6.2 Background of the Invention

The present invention relates to the field of electronic design automation and, in particular, to improved techniques for computationally efficient and accurate optical proximity correction. Further, adaptive sampling and adaptive fragmentation algorithms in the present invention can be suited or used for computations with SIMD processors such as graphics processing units.

The manufacture of integrated circuits strives to place ever smaller features onto a given area of the integrated circuit chip. One challenge encountered in this effort to fabricate smaller features is the diffraction of light used in photolithography. That is, the quality and fidelity of the microlithography stage of very large scale integrated (VLSI) circuit chip production depends on a wavelength of a light source and a size of the features to be printed.

Recent subwavelength lithography approaches aim to use wavelengths that are larger than the minimum feature size to generate images (e.g., light with a wavelength of 193 nanometers can be used to generate features with dimensions of 90, 65, or 45 nanometers). This approach, however, typically uses methods for the correction of degradations and distortions in the final pattern caused by light diffraction. That is, the photolithography mask used to generate a desired circuit pattern includes structures that anticipate and precorrect for imperfections arising from fabricating small features.

A computational simulation of the exposure and lithographic is run and the degradations or distortions are computed with various additions, inclusions and adjustments to the mask design. A mask design is selected that improves the final structure. These methods, commonly known as optical proximity correction (OPC), are mainly dependent on the optical system and mask features and may be computationally intensive. While regions having densely packed features tend to be more prone to distortions (the "proximity" effect), OPC calculations are not limited to such regions and can be advantageously applied to less-dense regions of the circuit.

OPC typically involved modeling numerous features in a pattern layout to be computationally processed one or more times. Recent advances in semiconductor manufacturing allow billions of transistors (e.g., multibillion features) to be placed on a single chip. "Moore's law" postulates that the number of transistors that can be placed on a single chip doubles about every 12-24 months. Unfortunately, despite the advances in the central processing unit (CPU) clock speed and computing power, the gap between the computational power required for OPC calculations and the available CPU processing power keeps increasing. That is, the computing power required to efficiently execute OPC calculations in a timely manner is growing at a faster rate than the available CPU power in a reasonably priced engineering workstation.

To further complicate the issue, a number of masks or layers to which OPC should be applied increases at new semiconductor device manufacturing nodes. Since the features are getting smaller with every manufacturing node while the illumination wavelengths remain the same or decrease at a slower rate, the number of neighboring features affecting the fidelity of each feature increases. Therefore, the computational processing power and accuracy required to perform OPC operations on new chip designs has been increasing at an enormous rate.

Presently, the generation of optically corrected masks takes from many hours to several days per mask and the complexity of this process continues to grow. Further, as feature density increases, the proximity effects become more pronounced and hence the accuracy of simulation becomes very critical. Since features printed after an OPC process may still be different from the desired features, the impact of each feature on the functionality and performance of the chip is readdressed in an iterative manner. A typical VLSI design process consists of several iterations of mask generation, OPC process, and interpretation of the results. These iterations may contribute several months of delay in the chip qualification and manufacturing process.

The persistent time-to-market pressures on new chip designs mandate improved methods to estimate and shorten the impact of the OPC process in the early stages of the design. Since it is computationally prohibitive to perform many iterations of OPC on a full-chip scale, partial or simple model-based OPC approaches are being applied in limited fashion, still necessitating full-chip OPC once the design is completed.

Therefore, a need exists in the art for improved systems, methods, and techniques that shorten a time required to perform OPC, improve the accuracy of OPC methods, and that are scalable to address larger chip designs.

Section 6.3 Brief Summary of the Invention

The present invention relates generally to the field of manufacturing integrated circuits and, more particularly, to using optical proximity correction (OPC) to improve a mask used for the printing of microelectronic circuit designs. Further, the present invention relates to increasing accuracy of OPC techniques while minimizing computational effort.

Accordingly and advantageously the present invention relates to adaptive OPC algorithms for hardware or software platforms.

An algorithm may include computation of optimal sampling points for light calculations for accurate representation of a light profile, inflection points for deciding a number of fragments, and length and position of the fragments for minimizing the number of fragments for a target accuracy. The final data may be transformed back to the original data format and exported for generation of the mask used to print a pattern on a semiconductor device.

An embodiment of the present invention can be readily utilized in the improvement of OPC methods used in the manufacture of semiconductor devices.

Structures arising in the manufacture of microelectronic devices are typically formed by creating a pattern of a desired structure in a layer of photoresist deposited over a material in which the desired structure is to be formed. The pattern in the photoresist is created by exposing the photoresist to light through a patterned exposure mask. The exposed photoresist serves as a physical mask during a subsequent etch step or steps where the pattern in the photoresist is transferred to the underlying material.

Distortions and degradations in the final structure can arise from a combination of factors such as light source variations, optical proximity effects, development process non-uniformities, and etch process non-uniformities, among others. A total amount of energy deposited in a given volume of photoresist during the exposure or printing step will determine if that volume remains or is removed during the subsequent development process. The image features being printed on current microelectronic devices may be much smaller than the wavelengths of light being used to print the features, (e.g., light with a wavelength of 193 nanometers is being used to generate features with dimensions of 90, 65, or 45 nanometers and below). The distortions may cause errors such as line thinning, end shortening, line thickening, or clipping, and the like.

Various methods of OPC may be used to improve the fidelity of the final pattern transferred to the target material. The pattern that is formed on the exposure mask may be altered to compensate for various systematic distortions. One such method involves the use of serifs to augment the pattern in areas where the distortions cause feature shortening, thinning, and the like. A serif is understood to be a small feature that may be placed at a corner or vertex of a main feature. The serif may be "positive" in that it adds area to the main feature or it may be "negative" in that it subtracts area from the main feature.

A goal of the OPC process is to calculate, improve, and optimize one or more features on an exposure mask so that a resulting structure realized on the chip meets design and performance requirements of the circuit. In an implementation, the OPC process calculates, improves, and optimizes all features on an exposure mask. Clearly, when a chip has billions of transistors, each with many fine structures, the computational requirements for OPC can be very large.

Current solutions to a typical optical proximity correction problem can be classified in two main classes: frequency-domain and spatial-domain.

Frequency-domain OPC computations use transform techniques to calculate new shapes of the features on an exposure mask to realize a desired structure on a chip. The convolution computations are replaced by multiplication operations in a frequency-domain on a uniform grid structure. An accuracy of the frequency domain OPC calculations increases as the number of the grid points increases. Many points can be used to include one or more of a local structure or structures that may impact the distortion of a feature being optimized. Each of these neighboring local structures can also be optimized.

The entire chip can be considered within a single calculation. However, this also dramatically increases the computational requirement. In an implementation, many points must be used to include all structures that may impact the distortion of the feature being optimized. In an implementation, each of these neighboring local structures must be optimized.

Spatial-domain OPC calculations are based on the spatial properties of features. Edges and vertices of features on an exposure mask, such as polygons or rectangles, are modified in an effort to minimize the difference between the actual structure realized using the corrected exposure mask and the desired structure.

Spatial domain OPC methods may enjoy several benefits over the frequency domain methods. For example, the light effects are generally localized to features in the immediate vicinity of the feature under consideration. Therefore, a size of a specific calculation may be smaller. However, the same calculation is made for one or more of the feature groups on the chip. In an implementation, the same calculation is made for all feature groups on the chip.

A typical solution to improve OPC accuracy would be to either increase a number of the sampling points or to perform a rule-based local refinement. Both approaches may have issues. In the former case, the computational effort increases tremendously since the computational complexity is of the order $O(n^2)$, e.g., proportional to n×n, where n is the number of points. In the later case, the accuracy improvement is neither provable nor guaranteed.

An alternative approach may be to use adaptive sampling and fragmentation which provides an accurate OPC algorithm which has an improved accuracy and yet minimizes computational effort for a target accuracy.

Adaptive Sampling Accuracy of an OPC computation may depend on a sampling location in a fragment, where an objective function, such as EPE (edge placement error), is sampled. In an implementation, an accuracy of an OPC computation depends on the sampling location in each fragment, where an objective function, such as EPE is sampled. In an implementation, for the best mask layout, these sampling points are located where the objective function assumes an extremum value, e.g., a location where a slope of the objective function along the fragment is zero.

Further, to make sure at an extrema in a layout there is at least one sampling point, initial fragmentation is done by inserting a fragment between at least one pair of consecutive inflection points (inflection points are the points, where curvature of the objective function along the line changes its sign). By such a fragmentation scheme, the extrema will have a sampling point, since whenever there is a change of curvature sign of a continuous function then it may assume an extremum value between the inflection points.

In an implementation, to make sure at every extrema in the layout there is at least one sampling point, initial fragmentation is done by inserting a fragment between each pair of consecutive inflection points. In this implementation, it is guaranteed that at every extrema there is a sampling point.

FIG. 6.1 shows a graph related to an adaptive sampling algorithm.

Adaptive Fragmentation Accuracy of an OPC computation may also depend on a size and location of a fragment in addition to a location of a sampling point. The following describes two approaches to accomplish adaptive fragmentation. In one approach, an objective function is minimized, subject to configurational and mask constraints, by computing a sensitivity of the objective function to movements of fragment ends. (\*\*\*left out\*\*\*)

In another approach, one can look at the jumps of normal movements of fragments and:

(i) Refine in locations where these jumps are large. This may indicate that the objective function is varying rapidly and hence requires finer discretization. Refinement can be accomplished inserting a fragment between two consecutive fragments, when there is a large normal movement jump between an original pair of fragments.

(ii) Unrefine (or, coarsen) in locations where these jumps are small. This may indicate that the objective function variation is slow and hence does not need as much refinement. Coarsening can be accomplished by merging a pair of fragments.

In this case, a number of sampling points may also change and is the same as the number of fragments.

In an implementation, an adaptive fragmentation computation is performed iteratively until the aggregate objective function sensitivity vanishes in the former case and a normal fragment movement jump is below a certain user defined threshold in the later case.

In an implementation, a combined algorithm of adaptive sampling and adaptive fragmentation is a min-max algorithm. In this implementation, the objective function is maximized in at least one fragment to obtain optimal sampling points and the aggregate objective function is minimized to obtain optimal fragmentation. In an implementation, the objective function is maximized in each fragment to obtain optimal sampling points.

In an implementation, all the operations are local. In this implementation, this algorithm is ideal for distributed computing, which may typically be the case. In another implementation, one or more operations are local. The parallel nature of algorithms nicely fits into the parallel hardware found in graphics processing units, for that matter any SIMD processing unit. In an implementation, to accomplish this list of sampling points objective function is stored either as texture or global memory in a linear array. In an embodiment, at least three points are used for evaluating optimal sampling locations. In this embodiment of the invention, to compute an optimal location for sampling locations, three values of the objective function from the current locations (e.g., two from current fragment and one sampling point from the next fragment) are transferred into a kernel along with the positions and then the optimal location is computed.

In the case of global memory, the computed location can be updated. In the case of texture memory, the computed optimal location may be first stored in a temporary buffer and at the end the calculation buffer is swapped with the texture memory. This may similarly apply for the case of adaptive fragmentation. In this case, as in the case of adaptive sampling, computations may be local.

Also, since a number of sampling points and fragments are minimal for a given accuracy, this algorithm is computationally efficient. Further, since a number of fragments are minimal, this may result in a minimal complexity mask resulting in cost and manufacturing efficiencies.

Section 7 Instruction Set Architecture-Based Hardware and Software Platform for Electronic Design Automation (EDA)

Section 7.1 Introduction

The present invention describes a platform in which electronic design automation (EDA) algorithms can be described independently from underlying hardware-software (HW-SW) components and executed efficiently. This platform may facilitate and enable porting of electronic design automation algorithms to various hardware-software platforms. Further, this may be done without any need for compilation or major restructuring. This platform may be composed of an Instruction Set Architecture (ISA) that is specifically developed for an Electronic Design Automation algorithm or algorithms, a scheduler, a synchronizer, a load balancer, other requisite hardware-software components for computations, or any combination of these.

Section 7.2. Background

Current hardware-software platforms used in the electronic design automation area typically rely on operating systems and software languages for both operation and performance. Commonly, algorithms are tightly integrated with the underlying operating system (OS) and the specific language in which the algorithm has been coded. For example, a vast majority of the electronic design automation algorithms are implemented on UNIX/LINUX operating systems with the C/C++ programming language. Although it fulfills the functional requirements of a VLSI chip design flow, it may not produce optimum results due to limitations of the underlying hardware platform, software platforms, or hardware and software platforms, such as the CPU or operating system. Since Electronic Design Automation algorithms are generally tailored for a specific hardware-software platform, converting them into new or different architectures such as Digital Signal Processors (DSPs), Field Programmable Gate Arrays (FPGAs), or Graphical Processing Units (GPUs) is extremely difficult and cumbersome without rewriting or restructuring entire computations.

Despite advances in CPU performance and speed over the years, computational requirements of a chip design have been increased to an even faster rate, necessitating new and improved methods other than single- or multi-threaded CPU utilization. The first examples of this shift in the industry have been observed with hardware simulation engines which convert an RTL description of a chip into a connected network of Field Programmable Gate Arrays to improve the simulation speed by about 100 fold.

Recently, several EDA algorithms, such as Design Rule Checkers and Extraction type of back-end related geometric algorithms, have been modified to work with a farm of CPUs (e.g., several hundred CPUs in some cases). These efforts may require a total restructuring of existing computation methods for a specific farm of CPUs (e.g., loosely connected CPU architecture). With ever-changing hardware architectures, a more efficient method, technique, or system is needed to map an algorithm or algorithms to a new hardware-software architecture.

Section 7.3 Parallel Processing Systems

In a parallel processing system, instead of having software carried out sequentially one instruction at a time, several different entities of a computational scheme can be executed simultaneously.

An example from the personal computer (PC) realm is to use the CPU for calculations while using another entity of the program for handling the data input/output (I/O) and reading data into memory without intervention of the CPU.

Parallel systems may have several different components:

(i) Processes: This component can execute an algorithm and can also manipulate resources in order to fulfill a mission of the algorithm. Furthermore, in an implementation, several processes can run on the same hardware or several hardware connected to each other. In an implementation, the processes execute a given algorithm and manipulate all the requisite resources in order to fulfill the mission of the algorithm.

(ii) Hardware: This is a resource that can be used to execute a given process. In an embodiment of the present invention, this can be one or more central processing units, graphics processing units, Field Programmable Gate Arrays, or Digital Signal Processors, or any combination of these, properly connected.

(iii) Schedulers: This unit can determine when a process runs, on which hardware platform it runs, and in what order it is supposed to run. A scheduler may be control a single computation engine or several engines (clustering).

In an embodiment, the scheduling can be done by assigning a priority to each process. When several processes are in a queue, the process with a highest priority runs on the hardware. In another embodiment Earliest Deadline First scheduling is employed to assign tasks to individual elements of computational engines to calculate a given EDA related task. The tasks can be assigned to individual elements such as one or more graphics processing units, Digital Signal Processors, or central processing units, or other components.

(iv) Synchronizers: This unit can operate in conjunction with schedulers and monitors and controls the access of processes to resources. Depending on the design, a synchronizer may allow only one single process to use a given resource at a time or it may allow several processes access to a given resource in a given order of priority.

(v) Context Switching: The scheme can be used to switch from one computational resource to another one. In an implementation, such a specific unit is required. In this implementation, an execution stack, memory area, and values contained in registers when last executing this process, etc., can be preserved for continuity.

(vi) Load Balancing: When a multiplicity of hardware resources are used for computations, a proper distribution of computations to the available resources may be implemented. This assignment can be done in the beginning or certain processes may be migrated from one computing resource to another one during its execution.

(vi) Command Pipelining: One or more computational steps in a given algorithm can be executed using different computational resources. Some examples of these computation resources are a central processing unit, graphics processing unit, Field Programmable Gate Array, or Digital Signal Processor. A distribution of these small steps into an available hardware resource is the core of a parallel processing system. Command pipelining is a methodology that controls this by determining independent pieces of a given computational scheme.

Section 7.4 Virtual Machines

A Virtual Machine (VM) is an abstract computing machine and a main feature of a Virtual Machine is its portability. With this capability, one can use a program and execute it on various platforms without having to recompile.

The portability can be achieved in several layers. In a first layer, programming software is developed such that variable types, instruction set and encodings are defined independently of the underlying hardware-software execution system. In a second layer, the manner in which the instruction set is packaged at a class level (e.g., binary encoding) is defined in a machine-independent fashion. In a third layer, a core set of runtime classes and an associated set of platform-specific native code abstract the interface between a Virtual Machine program and the underlying hardware-software execution system.

A compiler transforms a Virtual Machine program into a set of instructions. The Virtual Machine interprets the instructions in order to run the program. A Virtual Machine can be called an interpreter. In addition, the code can also be compiled straight or directly into native machine binary code.

Section 7.5 Instruction Sets

The type of work a processor carries out can be defined by its set of instructions. These instructions are usually coded in binary and may depend on the processor's architecture.

Most modern processors have built-in instructions specifically designed for certain applications such as audio and video processing. An example of this would be the MMX (MultiMedia eXtension) technology which Intel® Corporation uses in its Pentium® architecture. This special set of instructions allows for faster processing of audio and visual algorithms.

Section 7.6 Summary of Invention

A method, technique, and apparatus to execute at least one electronic design algorithm using a set of instruction set architectures specifically designed for at least one phase of a electronic design process is described. An advantage of the present invention is that it yields more efficiency than other platforms, such as a general purpose CPU based system.

The present invention discloses an Electronic Design Automation specific, hardware and operating system independent architecture, to program and execute at least one Electronic Design Automation computation. In an implementation, is unnecessary to make drastic modifications, such as restructuring and recompilation, in the event of underlying hardware-software or task changes. In an implementation, the requisite EDA computations are executed without making drastic modifications.

The architecture can be based on an Instruction Set Architecture approach that can be applied to general purpose CPU architectures. An x86 Instruction Set Architecture architecture has been a core of personal computers. Once compiled for the x86 architecture, a program can be executed on various hardware supporting this instruction set without compilation. Although this provides flexibility, the x86 type Instruction Set Architecture has a limitation of being tightly coupled to the hardware architecture (e.g., CPU).

A methodology of the present invention handles the design problems efficiently in the electronic design automation area.

Although the Instruction Set Architecture instructions might be different for several steps of the electronic design automation, the Instruction Set Architecture based platform approach can unify the way to handle the problem.

In an implementation, a hardware-software platform includes a virtual machine, and at least one component of a parallel processing system. In an implementation, the hardware-software platform further includes components such as a scheduler or load balancer.

An Instruction Set can be designed to execute specific electronic design algorithms efficiently. In addition, it can provide a description of one or more steps of an electronic design automation algorithm independent from an underlying hardware-software execution platform.

An execution unit may combine, reorder, distribute, or a combination of these, the execution of the instructions based on capabilities of the underlying hardware-software system to achieve an optimum performance. A sequence of instructions from selected Instruction Set Architectures can be executed on any platform supporting the Instruction Set Architecture without any modifications or reprogramming.

In an embodiment, the graphics processing unit hardware and driver software with a graphics processing unit specific scheduler are utilized as platform components. In another embodiment, the graphics processing unit hardware with Pixel and Vertex Shader Virtual Machines of DirectX are employed. Scheduling tasks can be casted to existing schedulers in the DirectX and graphics processing unit hardware.

In another embodiment, the execution can be performed on a single CPU hardware with operating system, and in another embodiment, the graphics processing unit hardware with Pixel Shader Virtual machine is used.

Specific instructions sets can be utilized to accommodate a different nature of electronic design automation design phases such as Design Rule Checking (DRC) or Optical Proximity Correction (OPC). Other design phases may also be used. This may unify the overall design process under a set of instructions. As a result, a typical design task may be significantly simplified.

Similarly, an Instruction Set Architecture-based algorithm execution can provide flexibility to an electronic design engineer to decide on an execution platform based on execution needs of the design tasks.

Since electronic design tasks and computations are specific and speed of execution, (e.g., the time required to complete a specific task) is important, selection of an instruction set and an execution platform may not be trivial. The Instruction Set Architecture-based approach provides faster design cycles, and also allows design optimization for cost, performance, etc.

FIG. 7.1 shows a simple block diagram of accessing a bank of computation engines through an application programming interface (API) and Instruction Set Architecture. As shown in the figure, the application programming interface is a domain specific application programming interface. The computation engines are a graphics processing unit, central processing unit, Field Programmable Gate Array, and a Digital Signal Processor. This is not intended to limit the invention and more or less computations engines can be used. For example, in another implementation, a graphics processing unit, two central processing units, and a Field Programmable Gate Array, and a Digital Signal Processor are used.

Section 7.7 Instruction Sets for Electronic Design Automation and TCAD Processes Since characteristics of tasks for typical VLSI design phases may be quite different from each other, specific instruction sets may be developed for one or more phases. In an implementation, specific instruction sets are developed for each phase. Some examples of these phases are routing, layout, timing analysis, OPC calculation, and design rule checking.

From a hardware standpoint, the actual mechanism of the hardware can be hidden from a user. In this scenario, the user deals only with parameters and memory models.

From a programmer's point of view, electronic design automation and TCAD algorithms are to be written by using the instructions available.

The present invention describes a unique set of instructions that allows the user to:
 (i) convert existing algorithms,
 (ii) facilitate development of new algorithms, or
 (iii) utilize any desired combination of underlying hardware,
 (iv) or any combination of these.

In an embodiment, the following set of instructions are used for accessing the graphics processing unit-central processing unit hardware platform:
 mult(x, y)
 add(x, y)
 dot(x, y)
 normal(x)
 min(x)
 max(x)
 indexing_2d_array(x, y)
 interpolate(x)

with the following memory architecture components:
(i) 1D array cache
(ii) 2D array cache
(iii) wide bus access Section 8 Optimal Implementation of Computational Algorithms on Hardware-Software Platforms with Graphical Processing Units Section 8.1. Introduction For mobile devices power optimization is one of the most critical factors.

Type of functions: self-contained electronic device that can store and play data which can be in various media formats; has wireless capacity to communicate/data transfer. Media may be a signal such as an audio, video, image, or any combination of these. Data may be stored in a memory unit such as a hard drive or a flash memory. Data may be a standard format such as MPEG, MP3, JPEG or non-standard. A battery operated device may have a display screen such as LCD or OLED. It may contain a card reader for data transfer.

Typical battery operated systems may include:
(i) audio/video players (e.g., Apple iPod),
(ii) digital multimedia broadcast players,
(iii) automotive navigation systems, or
(iv) internet radio devices.

Section 8.2. Background

A critical issue with a mobile system is the battery life. As feature sets constantly evolve, power optimization becomes highly critical. Feature sets are usually associated with new developments in the radio frequency (RF) section and computation hardware such as central processing unit (CPU) core processors, digital signal processors, audio and video processors, graphic processors, communication processors and display/lighting systems.

Power Unit:

Today, in a typical mobile device there is a power conversion unit which downconverts typically 3.6V battery output to 1.2V to conserve energy. Given their efficient power conversion, DC-DC buck converters may be preferred over linear regulators, which work at around 40% efficiency. This section usually supplies power to the computation hardware.

Communications Unit:

A second system to consider is the radio frequency section. This section may include several different communication systems such as Bluetooth, 802.11 Ethernet wireless LAN or 3G cellular system. Power requirements for the radio frequency section are different from those for the computational hardware because of the signal quality requirements. In order to achieve a better signal-to-noise ratio, most radio frequency circuits operate from a 3V or 3.3V supply. In general, current consumption of RF circuits usually runs much lower than the computation hardware.

Recent developments in the computation hardware area indicate that existing software is not written to benefit from the potential. Even though parallel environments such as multiprocessor and multicore platforms are being introduced, performance of existing applications is not improving proportionally. To address this issue, the existing software needs to be rewritten to utilize parallel computation capabilities in the new platforms.

As a consequence of this, in an implementation, all the software may have to be parallelized. In another implementation, some software may have to be parallelized.

An approach may be to write a universal compiler and doing this automatically. Unfortunately, today, there is no compiler technology to parallelize a given software efficiently. Parallel compilers have been studied for more than 30 years and to this day, there is no generic load-balancing or scheduling technology that works efficiently for any given platform and for any given software.

FIG. 8.1 shows a table listing typical computation platforms. Given their growth rate and computational capacity, GPUs are underutilized for mobile applications.

Section 8.3. Summary of the Invention

In the present patent application, a method, technique, and system to utilize existing computational capacity in mobile devices optimally is described. The method, technique, or system executes on a mobile hardware-software system. The system typically includes a computation hardware such as graphical processing unit (GPU), Digital Signal Processors (DSP), or a CPU.

In an embodiment, the hardware-software system is composed of a hardware platform containing a radio frequency section, central processing unit, Digital Signal Processor, graphical processing unit, and an operating system, such as Microsoft Windows®, Symbian®, Palm®, and any other requisite software.

In an implementation, at least one hardware unit has its own dedicated task.

The present invention exploits not only the task level but also fine grain (instruction level) parallelism of the hardware while utilizing high data bandwidth and parallel memory architecture. By distributing tasks optimally to the available hardware we achieve optimal hardware utilization to improve performance of at least one application, minimization of power consumption, improvement of system stability when executing multi tasks.

In an implementation, a dedicated hardware approach may be employed. In another implementation, multiutilization for each hardware unit may be employed.

In an embodiment graphics processing units are utilized for display, communication/audio/video signal processing, and data decryption.

In another embodiment, an audio digital signal processor is utilized for audio signal processing and for communication decoding.

The parallel nature of many mobile computations nicely fits into the parallel hardware found in graphics processing units. Specialized hardware existing in graphics processing units allows certain tasks to be performed in a parallel fashion much faster than the general purpose CPU architectures.

FIG. 8.2 shows a diagram of an application A, a middle layer—A, and hardware resources. In this figure, the hardware resources are a central processing unit, graphics processing unit, field programmable gate array, digital signal processor, and an ASIC. FIG. 8.3 shows a diagram of an application B, a middle layer—B, and hardware resources. In this figure, the hardware resources are a central processing unit, graphics processing unit, field programmable gate array, digital signal processor, and an ASIC. In another implementations, the hardware resources may be a different combination.

FIG. 8.4 shows a graph of delay on an x-axis and battery power on a y-axis. FIG. 8.5 shows a graph of delay on an x-axis and computational power on a y-axis.

Section 9. A GPU-Based Full-Chip Source-Mask Optimization Solution

Section 9.1. Abstract

The present invention describes an optimization of source and mask with full-chip capability. In an implementation, a simultaneous optimization of source and mask with full-chip capability is performed. To provide full-chip processing capability, a solution can be based on graphics processing units (GPUs) as well as central processing units (CPUs) and made scalable to a number of clusters while maintaining convergence. In an implementation, at least one graphics processing unit and at least one central processing unit is made scalable to a large number of clusters. An approach can use a proprietary search algorithm to converge to an optimal solution in the sense of print quality maximization while obeying existing mask manufacturing, lithography equipment and process technology constraints. A solution can be based on a proprietary optimization function that is applicable to both binary and phase shift masks.

Section 9.2. Keywords: Source Mask Optimization, Graphics Processors, Inverse Lithography, Computational Lithography, Full-Chip, Genetic Search, Process Window.

Section 9.3. Introduction

A generation of lithography steppers with customizable light source profiles can be used to extend the life of 193 nanometers wavelength lithography. A yield of a VLSI design for 32 nanometers and below can be improved to production levels with simultaneous source and mask optimization. This approach has not been widely applied in the field due to a variety of technical issues including: (i) intractable computer run-times, and (ii) nonmanufacturable masks are synthesized.

Previous source and mask optimization approaches are computationally expensive. Using a suboptimal solution which selects a small subset of the layout and optimizes the light source shape accordingly has had a limited business and technical success. Presently, there is no practical solution that addresses needs for full-chip source-mask optimization (SMO). Fabrication houses can employ clusters comprising up to several hundred to several thousand processors. In an implementation, a feasible source-mask optimization solution does not use more than this many processors. Compared against commonly employed computational hardware platforms, it is clear that GPUs would be the best choice for computational lithography-related modeling and simulation tasks.

Graphics processing units programming typically uses specific algorithms developed for a given problem. For example, there may not be a universal tool that compiles given sequential technical computing software for a graphics processing unit hardware. For a given problem, graphics processing unit-specific algorithms, utilizing the parallelism in the hardware, may be developed to achieve an attractive performance advantage. By utilizing specialized hardware, such as the texture interpolators, as well as critical data organization techniques selected to maximize locality to leverage multi-cache graphics processing unit memory architecture, an optimization algorithm may be designed to use graphics processing units as well as CPUs as computation hardware for a source-mask optimization approach.

Section 9.4 Technical Background

One way to formulate a simultaneous optimization of a light source profile and mask shape of a full chip integrate circuit layout layer can be a min-max optimization problem:

$$\max(\min(\phi_i(s_i, m_i))) \quad (1)$$

where $s_i$ is a source variable, $m_i$ is a mask variable of an $i^{th}$ pattern, and $\phi_i(.,.)$ is a generalized function representing a printing quality for the $i^{th}$ pattern, whose variables can be a process window (PW), mask error enhancement factor (MEEF), or edge placement error (EPE), and others. In an implementation, the $i^{th}$ pattern can have its own print quality function $\phi_i(.,.)$ to allow for different compromises.

This formulation can be viewed as finding one or more worse patterns among one or more patterns and maximizing their printing quality. Optimizing a source shape for a set of critical patterns might create a new set of critical patterns. In this case, in an implementation, the mask shapes may be optimized simultaneously. A shape may be critical or may not be critical.

In an implementation, all shapes are critical. In another implementation, not all shapes are critical. The critical shapes in a lithographical sense, such as dense layouts and minimum feature shapes, are likely the ones that predominantly determine the shape of the source. A technique for for selecting and weighting the shapes is described below.

In the present invention, a method, technique, or system to determine a source shape for a full-chip layout is described per the methodology in this patent application. Further, a source-mask optimization method, technique, or system for selected shapes is also described. We present an SMO optimization method for all the selected shapes in this patent application.

Section 9.5. Hierarchical Selection of Critical Features

A goal of a source mask optimization method for full chip integrated circuit layouts is simultaneous modification of both source shape and mask features to ensure that one or more shapes in a target layout, L, are printed with a particular printing quality. In an implementation, the particular printing quality is the maximum printing quality possible. A modification method can be applied to one or more shapes in the layout to guarantee the best results. Unfortunately, just the modification of the mask shapes for a fixed source shape, S, known as optical proximity correction, may be very computationally intensive. Furthermore, inverse lithography technology (ILT), which may provide better results, may be even more computationally intensive, requiring an even larger number of computational resources than traditional OPC.

In lithography, a light source shape may be selected that maximizes printing quality of user selected layout portions. However, this approach can lead to poor printing quality because the user cannot always select the layout portions necessary for a globally optimal result.

In an implementation of the present invention, a critical feature selection method is described that uses existing integrated circuit layout data hierarchy. There may be many shape repetitions in integrated circuit layouts, such as bit-cells for memory structures as well as logic gates.

A main idea behind this step is to identify "unique" shapes within an integrated circuit layout. A unique shape can be defined as a shape. This shape can be a polygon or part of a polygon, having zero or more shapes within a predefined vicinity (ambit), and having a unique configuration in the two-dimensional space. The unique shapes and their neighbors can define one or more shapes that are used to compose a given integrated circuit layout. These shapes can be considered as the "basis" functions of a given integrated circuit layout. Therefore, an optimization of a light source profile and mask shapes may have the same quality of printing everywhere in the integrated circuit layout. In an implementation, an optimization of a light source profile and mask shapes guarantee the same quality of printing everywhere in the integrated circuit layout. In another implementation, an optimization of a light source profile and mask shapes may have the same quality of printing in at least two portions of the integrated circuit layout.

Two main reasons behind this motivation are: (i) to shorten turn-around time, and (ii) to improve the fidelity of results (e.g., repeated shapes are decorated identically to control variability in wafer contours).

In an implementation, all unique shapes are the critical shapes. In another implementation, one or more of the critical shapes are not a unique shape. In this implementation, since not all the unique shapes are the critical shapes, a heuristic method can be used to sort the basis shapes with respect to their criticality. In an implementation, a heuristic method uses cell instance statistics (e.g., a number of occurrences, sizes, etc.), and cell characteristics (e.g., a number of lithographically critical shapes, distribution of the different width and pitches, etc.), gathered from a hierarchical integrated circuit layout representation. Not all shapes may contribute to the print quality. The densest shapes may dominate. In addition, there may not be a single source shape that would optimize all the shapes in the layout.

This step can be viewed as "ranking" of unique shapes. In an implementation, after this process is completed, one can make an informed decision to exclude the shapes that are not critical and optimize the source profile for the remaining shapes. In an implementation, to achieve a truly global optimum at the expense of increased computational cost, all the "unique shapes" are used to design a source profile. A unique shape finding algorithm is presented in this patent application. This approach handles size adjustments for the ambit region to handle the SMO cases.

A strategy for ranking of unique shapes and selection of critical ones may be dependent on printability requirements and process variations. In an implementation, commonly accepted measures such as normalized image light slope (NILS) and its variation within the expected CD may be used. Similarly, a selection of gauging points or CD measurement locations may also affect the printability. The proposed ranking function uses the following sensitivity measure $$r_s(S, M_i) = \sum_{p=1}^{P} M(S, M_i, G_p) / \aleph(S, M_i, G_p)$$

where P is a number of gauge points, $i=1, 2, \ldots, N_u$, where $N_u$ is a number of unique shapes, M is a mask error enhancement factor (MEEF) function and $\aleph$ is a normalized image light slope function, which are defined as $$M(S, M_i, G_p) = \frac{\partial l(S, M_i)}{\partial [\![M(G)]\!]_p}$$

$$\aleph(S, M_i, G_p) = \frac{1}{\Im(M_i, G_p)} \cdot \frac{\partial l(S, M_i)}{\partial G_p}$$

where $l(S, M_i)$ is a light intensity distribution on a wafer (e.g., calculated by using transmission cross-coefficients (TCC) and a light source shape, S), and $\Im$ is a minimum width or spacing of a shape surrounding $G_p$ in either x or y direction. A selection of gauge point $G_p$ can be based on one or more edges of a critical shape polygon.

A mask error enhancement factor term, M, can determine a sensitivity of a unique shape to mask manufacturing issues, and a normalized image light slope term, $\aleph$ can define the sensitivity to a process variation. Many improvements to the ranking formulation can be made to represent the manufacturing specifics. For example, in an implementation, stepper settings are used.

After the $r_s(.,.)$ term is computed, a subjective weighting can be applied to guide the selection process. In an implementation, a frequency and distribution of dense shapes in "unique shape" configurations is used to calculate a rank:

$$\Re(S,M_i) = r_s(S,M_i) \cdot g(M_i)$$

where g(,) is a density function defined as $$g(M_i) = \sum_{p=1}^{P} \frac{1}{\Im(M_i, G_p)}$$

In another implementation, frequency and distribution of one or more dense shapes in one or more "unique shape" configurations are used to calculate the rank.

A selection of critical shape configurations, $M_c$, is done by a thresholding criteria. For example, in an implementation, a shape complying to $\Re(S,M_i) > \Gamma$, where $\Gamma$ is a threshold, is selected as a critical shape.

Section 9.6 The Source-Mask Optimization Algorithm

An optimization algorithm may consist of light source and mask shape synthesizers as well as an initialization stage. FIG. 9.1 shows a block diagram of a proposed source-mask optimization methodology.

Section 9.6.1 The Initialization Method

To guide an optimization algorithm and provide better convergence properties, an initialization step may be added. In this step, both an initial source shape, $S_0$, and an initial decorated mask, $M_0$, are generated. In an implementation, the initial source shape is generated before the initial decorated mask. In another implementation, the initial decorated mask is generated before the initial source shape. In yet another implementation, the initial source shape is generated substantially simultaneously with the initial decorated mask.

In an embodiment of the invention, the following describes an initialization algorithm:

Given:
(i) a target layout, T,
(ii) a print quality function, $\phi(.,.)$, and
(iii) a set of critical shapes $M_i$, where $i=1, 2, \ldots, C$, with C being a total number of critical shapes, Compute:
a seed light source shape, $S_0$, and a seed decorated mask, $M_0$.

This algorithm can be implemented in two stages. In an implementation, in each stage the lithography simulator running on graphics processing unit clusters is utilized for contour generation. In another implementation, in one or more stages the lithography simulator running on graphics processing unit clusters is utilized for contour generation.

Stage 1: Given T and M, find an initial source shape, $S_0$, that maximizes $\phi_i$ over one or more parameters of a given light source shape and its combination as described as explained in this patent application. As another example, stage 1 can be: Given T and M, find an initial source shape, $S_0$, that maximizes $\phi_i$ over the parameters of given light source shapes and their combinations.

Stage 2: Given $S_0$ and M, find a decorated mask, $M_0$, that maximizes the $\phi_i$ using inverse computations as described in this patent application.

In Stage 1 of the initialization, the seed source shape parameters can be searched by using a parametric search algorithm. In an implementation, one or more parameters such as σ-inner, σ-outer, quasar angle, for one or more known source shapes, such as annular, quasar, quadrupole, dipole, and their linear combinations are searched. In an implementation, during these searches, it is assumed that the source has a flat top profile. In other words, the points that produce light always produce the same amount of light per solid angle, independent of their location. To find a global solution, the following genetic algorithm-based search method is developed.

Section 9.6.1.1 Initialization of the Light Source

Initialize the algorithm parameters (i) a set of light source parameters to be optimized, (ii) a set of known shapes to be used during the search, (iii) a generation size, N, mutation and cross breeding statistics, and strategy.

In an implementation, while no more improvements or max iteration count is reached, for each iteration, i, (i) Generate a new generation, for at least one offspring, $O_{ij}$ which contains the following information {light source type, parameter$_1$, . . . , parameter$_N$}, where j=1, 2, . . . , N.

During this step, the algorithm may utilize the mutation and cross breeding statistics, as well as the strategy to generate new offspring.

(ii) For at least one offspring, $O_{ij}$, in the generation i, (ii.a) Generate light source $TCC_{jk}$ for k process window conditions, (ii.b) For at least one gauge point $g_p$ in gauge set, G, compute wafer contours and CD values, $CD_{jkp}$, using (ii.c) Compute $\phi_{jp}$ for at least one gauge point $g_p$ by using $CD_{jkp}$ and $TCC_{jk}$ where p=1, 2, . . . , P; some being implemented on the graphics processing unit-based litho simulator cluster.

(ii.d) Compute a cost function, $\phi_{ij}$, by using a weighted average of $\phi_{jp}$ computed in the previous step.

In another implementation, while no more improvements or max iteration count is reached, for at least one iteration, i, (i) Generate a new generation, for each offspring, $O_{ij}$, which contains particular information. This information can be {light source type, parameter$_1$, parameter$_N$}, where j=1, 2, . . . , N.

During this step, the algorithm may utilize mutation and cross breeding statistics, as well as the strategy to generate new offspring.

(ii) For each offspring, $O_{ij}$, in the generation i, (ii.a) Generate light source $TCC_{jk}$ for k process window conditions, (ii.b) For each gauge point $g_p$ in gauge set, G, compute wafer contours and critical dimension (CD) values, $CD_{jkp}$, using (ii.c) Compute $\phi_{jp}$ for each gauge point, $g_p$, by using $CD_{jkp}$ and $TCC_{jk}$ where p=1, 2, . . . , P; all being implemented on the graphics processing unit-based litho simulator cluster.

(ii.d) Compute a cost function, $\phi_{ij}$, by using a weighted average of $\phi_{jp}$ computed in the previous step.

In an implementation, to speed up this stage, a parallel genetic algorithm is implemented on graphics processing units, in addition to the graphics processing unit-based litho simulator. Due to the parallel nature of the computation in this algorithm, a mapping to a graphics processing units platform is done such that for each offspring in each generation, the cost function is computed in parallel in each graphics processing units core in the cluster.

Section 9.6.1.1.a Offspring Generation and Selection Strategy

A convergence rate and a quality of the results in genetic algorithms may depend on the strategy used to generate and select the offsprings. In an implementation, the following two steps can be used for this purpose.

(i) Selection of candidates for next generation: The present approach describes using a "tournament selection" method for selecting candidates by using the $\phi(.,.)$ value of an offspring. A main advantage of this method is that the mating pool (e.g., the pool of offsprings that is used for generation) has a higher average fitness than the average population fitness. Performance advantages of this method in noisy fitness functions, having modeling inaccuracies just like in the light shape search problem, are superior.

(ii) Generation of offsprings using mating pool: An elitist method with high probability of mutation and crossover has been applied.

Section 9.6.1.1.b Computational Complexity

The computational complexity of a source shape initialization algorithm can be very high if special care is not taken. A new light source shape parameter is calculated for at least one offspring, $O_{ij}$, which might require generation of at least one TCC coefficient. In addition, a forward path lithography simulation for at least one critical shape, $C_i$, may be required to estimate the $\phi(.,.)$.

In an implementation, new light source shape parameters are calculated for each offspring, $O_{ij}$, which might require generation of TCC coefficients each time. In addition, the forward path lithography simulation for each critical shape, C, is required to estimate the $\phi(.,.)$. For example, for a full chip case, a number of critical shapes may be in 1000s. In these types of nonlinear cost functions, a required number of offsprings could be in 1000s and a typical solution may require 1000s of iterations. These assumptions suggest that the TCC coefficients and light simulations would be repeated $10^9$ times.

To reduce a number of computations (e.g., requisite computations) the following two observations are made.

(i) A result of the initial light generation stage is just a seed that shall be used for optimization. Therefore, the actual shape needs not to be exact. In this implementation, the actual shape is not exact.

(ii) The intensity values of a light source with similar parameters can be approximated.

By using these observations, we first perform a subsampling in the parameter space. For example, if we search the parameter space of {σ-inner, σ-outer, quasar angle} with ten samples per parameter, a total of 10×10×10=1000 samples is generated. These sample points do not need to be uniform. In an implementation, these sample points are uniform. In another implementation, these sample points are not uniform. Then, the light profiles for each critical shape are computed. Following the example, $10^3$ TCC and light computations shall be performed for each critical shape and the total light intensity computations can be reduced to a $10^6$ range. Assuming that 4-6 samples per parameter should suffice for a good approximation, the total TCC and light intensity computations can be reduced to a $10^5$ range.

In an implementation, during an iteration, for at least one offspring, $O_{ij}$, a light intensity is approximated by interpolating intensities from the closest parameter samples. In another implementation, during each iteration, for each offspring, $O_{ij}$, a light intensity is approximated by interpolating the intensities from the closest parameter samples. For example, if the parameter set has three variables, the closest eight samples are used to estimate the light intensity value. Therefore, for each offspring, $O_{ij}$, the intensity computations can be reduced to simpler interpolations. Assuming that second- to third-order polynomials suffice to approximate the light value, the total computational load for each light intensity can be reduced to 10s of multiplications.

However, $10^9$ $\phi(.,.)$ computations may still be required. By restricting a size of the critical area, a number of light interpolations can be further reduced. For example, if an optical proximity ambit of 1-2 μm is selected and the light intensities are computed with 10 nanometer spacing, the total number of light intensities per $\phi(.,.)$ is in the order of $100 \times 100 = 10000$s. Therefore, the total computation is in the order of (a number of $\phi(.,.)$ computations)×(a number of light intensity samples)×(intensity interpolation computations)=

$=10^9 \times 10^5 \times 10^2 = 10^{16}$ floating point operations per second (FLOPS). On today's typical graphics processing units, $10^{12}$ computations can be done in one second, (i.e., 1000 GFLOPS). Even on a single graphics processing unit desktop computer with 8 graphics processing unit cards, computations can be completed within one hour. To complete similar types of calculations only on central processing units with 20 GFLOPS per core, a system with a few hundred central processing unit cores is required.

Section 9.6.1.2 Initialization of the Mask

In a second stage of initialization, an initial decorated mask, $M_0$, can be synthesized using a seed source shape, $S_0$, found in the previous stage. A simplified version of an inverse method is utilized to find both the decorated shapes as well as the assist features (SRAFs). Given the required computational complexity of these algorithms, an embodiment of the present invention describes an approximate version which uses simplified light and process models. The calculations are computational complex.

In a specific implantation, given an initial light source, $S_0$, and a gauge point set, G,
  (i) Compute the $TCC_k$ for k process conditions,
  (ii) Set $M_0$=Target Mask, and
  (iii) While no more further improvements can be done or max iteration count reached,
    (iii.a) Generate a continuous mask representation of $M_0$,
    (iii.b) Compute intensity values, mask error enhancement factor, slopes for each gauge point, $g_k$ for each process condition, k,
    (iii.c) Compute the $\phi(.,.)$, and
    (iii.d) Synthesize a mask shape.

In another implementation, step (iii.b) can be: Compute intensity values, mask error enhancement factor, slopes for at least one gauge point, $g_k$ for at least one process condition, k.

Section 9.6.2. The Optimization Algorithm

In an implementation, a source-mask optimization method employs an iterative algorithm. In an implementation, in each iteration, two separate optimization problems are solved sequentially as in the initialization algorithm and the result of each stage is fed to the next stage. In another implementation, in at least one iteration, at least one optimization problem is solved sequentially with another optimization problem. In this implementation, a result of at least one stage is fed to another stage.

In an implementation, the optimization algorithm works as described below.

Given an initial light source shape, $S_0$, initial mask shape, $M_0$, a set of gauge points, G,
  (i) While there are no improvements to the $\phi(.,.)$ or the predefined number of steps is reached,
  Step 1: Compute $i^{th}$ iteration light source shape, $S_i$ using $S_{i-1}$ and $M_{i-1}$
  Step 2: Compute $i^{th}$ iteration decorated mask, $M_i$ using $S_i$ and $M_{i-1}$
  (ii) Legalize the mask based on manufacturing constraints. Details of each step are described in the following section.

Section 9.6.2.1 The Source Shape Optimization

In a first stage of at least one iteration, for a given fixed mask, $M_{i-1}$, computed from the previous iteration, a light source shape, $S_{i-1}$, that maximizes the process window is searched. A pixelized light source space is utilized for facilitating the search. Due to the nonlinear nature of the light source shape, modifications in at least one step may be constrained. In at least one iteration, only light pixels that are within a given vicinity of the existing group of pixels are modified.

In another implementation, in a first stage of each iteration, for a given fixed mask, $M_{i-1}$, computed from the previous iteration, the light source shape, $S_{i-1}$, that maximizes the process window is searched. A pixelized light source space is utilized for facilitating the search. Due to the nonlinear nature of the light source shape, modifications in each step are constrained. At each iteration, only the light pixels that are within a given vicinity of the existing group of pixels are modified. In addition, some new groups may be generated in random locations outside the existing pixel groups.

In an implementation, a genetic algorithm below is used to reach this goal.
  (i) Given a pixelized source shape, $S_{i-1}$, continuous transmission mask, $M_{i-1}$, halo thickness, h, and shape modification strategy,
  (ii) While no more improvements are made or max iteration count is reached
    (iii) For at least one iteration, i,
    (iii.a) Generate a new generation, at least one offspring, $O_{ij}$, contains the following information source Shape, $S_{i-1}$, halo thickness, shape modification strategy and fitness value.
    (iii.b) Compute the $\phi(.,.)$ for at least one offspring $O_{ij}$ using the light source the mask information.

In another implementation, a genetic algorithm below is used.
  (i) Given a pixelized source shape, $S_{i-1}$, continuous transmission mask, $M_{i-1}$, halo thickness, h, and shape modification strategy,
  (ii) While no more improvements are made or max iteration count is reached
    (iii) For each iteration, i,
    (iii.a) Generate a new generation, each offspring, $O_{ij}$, contains the following information source Shape, $S_{i-1}$, halo thickness, shape modification strategy and fitness value.
    (iii.b) Compute the $\phi(.,.)$ for each offspring $O_{ij}$ using the light source the mask information.

To select and generate the offsprings, a strategy similar to the one outlined in section Section 9.6.1.1 can be used.

Following the discussion in section 9.6.1.1, $10^9$ TCC coefficients may be calculated and $10^5 \times 10^3 = 10^8$ light intensities for this algorithm may be converged. Note that, unlike Section 9.6.1.1, the TCC coefficients may not be predictable. However, the following specific property of the designed algorithm allows us to reduce the computations for light intensities: a variation in a light source profile between generations may be restricted to a few pixels. By using the superposition principle, incremental light values are computed efficiently by the Abbe formulation.

Section 9.6.2.2 The Mask Shape Optimization

Given a light source, $S_i$, a synthesis of the mask shapes, $M_i$, can be done. A method simultaneously optimizes mask shapes, SRAF shapes and locations. The method can utilize a continuous transmission and nonpixelized mask representation to perform an initial search. The method can apply a legalization (binarization+mask constraints) gradually by modifying the continuous tone/continuous shape mask towards manufacturable mask transmission values, e.g., "0,1" for binary, and "0,1,–1" for phase shift, and mask shape constraints such as minimum spacing, minimum area, etc. In an implementation, in a step of the source-mask optimization process, the following strategy can be used for the mask.

In general terms, a mask synthesis can be done in two stages using an error norm as a part of a feedback loop:

(i) In a first stage, a pixelized mask $M_p$, where each pixel's transparency varies continuously between an $m_0$ and $m_1$, is synthesized, where $m_0$ and $m_1$ are the lower and upper boundaries for the final pixel value, respectively.

(ii) In a second stage, $M_p$ is converted to $M_{mid}$, by pushing the pixel values towards either $m_0$ or $m_1$, but not exactly set to either $m_0$ or $m_1$ yet. During this process, a new cost function including initial terms and secondary binarization terms may be used.

In an implementation, in at least one stage of the mask synthesis, a conjugate gradient based optimization algorithm is employed. In another implementation, in each stage of the mask synthesis, a conjugate gradient based optimization algorithm is employed. A search space is selected as the complex Fourier coefficients of the mask, M. These values are modified through finding the impact of each of these coefficients.

The following cost function can be used to determine a fitness of any given mask, M.

$$F_{total} = (1-\eta)F_{cont}(M) + \eta F_{binary}(M,M_p) + F_{mask}(M) \quad (2)$$

where $F_{cont}$, a continuous mask transmission fitness function, is used to compute how well the contours generated from the mask, M fit to the target layout, L. This function may have several components. For example, to account for the effects of process conditions during the optimization, we compute error (e.g., fitness) of the mask, M, in four focus-exposure conditions and at nominal (ideal) conditions and combine their effect with different weights.

$F_{binary}$, a binary fitness function, is used to binarize the mask. After the initial phase of the optimization, which produces the continuous transmission mask $M_{cont}$, an optimization loop starts binarizing the continuous mask, $M_{cont}$. In an implementation, this can be achieved by drifting a transmission value of at least one pixel based on a warp function. For at least one pixel value, the center peak is adjusted at a beginning of the binarization stage. In another implementation this can be achieved by drifting the transmission value of each pixel based on a warp function. For each pixel value, this center peak is adjusted at the beginning of the binarization stage. This function has two important properties:

(i) it is a continuous and differentiable function, and
(ii) the transmission numbers are bounded.

$F_{mask}$, a mask fitness function, is used to complete the binarization process. In an implementation, during the optimization, a transmission of at least one pixel is modified. Since a transmission of at least one pixel is modified, this value can go below a minimum value, $m_0$, and beyond a maximum value, $m_1$. Although this produces a solution, this infeasible solution is expected to be far from the feasible binary solution which then produces a sub-optimal result. To prevent this from happening, the $F_{mask}$ function finds at least one pixel which has a transmission value bigger or greater or larger than $m_1$ or smaller or less than $m_0$ and computes a sum of the squared differences. In other words, it computes a distance measure where at least one individual pixel can be viewed as a dimension.

In another implementation, during the optimization, the transmission of each pixel is modified. Since the transmission of each pixel is modified, these values can go below a minimum value, $m_0$, and beyond a maximum value, $m_1$. Although this produces a solution, this solution is expected to be far from a feasible binary solution which then produces a suboptimal result. To prevent this from happening, the $F_{mask}$ function finds all the pixels which have transmission values bigger than $m_1$ or smaller than $m_0$ and computes a sum of the squared differences. In other words, it computes a distance measure where each individual pixel can be viewed as a dimension. This algorithm is computational complex.

Section 9.7 Experimental Results

In this section, simultaneous source mask optimization results are presented. In a 22 nanometer example, a contact layer is selected to illustrate a progression of a methodology. As the printability function, $\phi(.,.)$, we have selected the product of dose and defocus tolerances, under the constraint that the edge placement error should be less than 10%.

FIGS. 9.2-9.6 show an example of a shape processed according to a specific embodiment of the invention. FIG. 9.2 shows an original layout, M. After a hierarchical analysis, "critical" patterns in FIG. 9.2 were identified. FIG. 9.3 shows these critical patterns. By using these "critical shapes," the light source profile shown in FIG. 9.4 is generated. FIG. 9.5 shows a final decorated mask using the optimized light source profile. FIG. 9.6 shows a final make after the inverse lithography technology. As a result of this optimization the printability function, $\phi(.,.)$, was improved by about 11%, compared to the optimized quasar light source.

Section 9.8 Conclusions

A method, technique, or system of an embodiment of the present invention is described that improves the printability of a given integrated circuit layout. In the method, technique or system, a simultaneous source profile and mask shape optimization algorithm may be used to improve the printability of a given integrated circuit layout. In an implementation, an automated method guarantees source-mask optimization optimality for a given layout by identifying the "critical" shapes, the "unique" shapes and their neighboring shapes. This implementation may use a "ranking" methodology for optimizing a printability function. The present invention can be extended to include source profile manufacturability constraints and mask error enhancement factor.

This description of the present invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
using at least one processor, varying each pixel's transparency of a pixelized mask between at least to a first and second boundary values;
converting the pixelized mask by increasing pixel values toward the first or the second boundary values;
computing contours generated for a continuous mask corresponding to the pixelized mask using a cost function comprising $$F_{total} = (1-\eta)F_{cont}(M) + \eta F_{binary}(M,M_p) + F_{mask}(M); \text{ and}$$

based on the continuos mask and pixelized mask, generating an optimized semiconductor mask.

2. The method of claim 1 wherein the at least one processor comprises a graphics processing unit.

3. A method of optical proximity checking comprising:
initializing a set of light source parameters to be optimized;
initializing a set of known shapes to be used during a search;
initializing a generation size for a light source;

generating a new generation for at least one offspring of a light source which comprises a light source type and light source parameters;

using the at least one offspring of a light source, computing and critical dimensions (CD) for semiconductor wafer contours;

varying each pixel's transparency of a pixelized mask between at least to a first and second boundary values;

converting the pixelized mask by increasing pixel values toward the first or the second boundary values;

using at least one processor, computing contours generated for a continuous mask corresponding to the pixelized mask using a cost function comprising $$F_{total}=(1-\eta)F_{cont}(M)+\eta F_{binary}(M,M_p)+F_{mask}(M); \text{ and}$$

based on the continuos mask and pixelized mask, generating an optimized semiconductor mask.

4. The method of claim 3 wherein the at least one processor comprises a graphics processing unit.

5. The method of claim 1 wherein $F_{cont}$ is a continuous mask transmission fitness function and can be used to compute how well contours generated from mask M fit to target layout L.

6. The method of claim 1 comprising:
computing an error of mask M is computed in four focus-exposure conditions and at nominal conditions.

7. The method of claim 1 wherein the cost function is a continuous and differentiable function.

8. The method of claim 1 wherein the cost function comprises transmission numbers that are bounded.

9. The method of claim 1 wherein $F_{mask}$ comprises a mask fitness function finds pixels having transmission values bigger than $m_1$ or smaller than $m_0$, or both.

10. The method of claim 1 wherein $F_{mask}(M)=\Sigma\Sigma\Gamma_{tr}(M(x, y))^2$.

11. The method of claim 10 wherein $$\Gamma_{tr}(M(x, y)) = \begin{cases} f_1(M, x, y, m_0, m_1), & \text{if } m_0 < M(x, y) < m_1 \\ f_2(M, x, y, m_0, m_1), & \text{if } m(x, y) < m_0 \\ f_3(M, x, y, m_0, m_1), & \text{if } m(x, y) < m_0 \end{cases}.$$

12. The method of claim 2 wherein the graphics processing unit comprises a vertex processor unit.

13. The method of claim 2 wherein the graphics processing unit comprises a vertex processor unit, fragment processor unit, stencil buffer, and video processor unit.

14. The method of claim 2 wherein at least one of the following instructions are used for accessing the graphics processing unit: mult(x, y), add(x, y), dot(x, y), normal(x), min(x), max(x), indexing_2d_array(x, y), or interpolate(x).

15. The method of claim 3 wherein $F_{cont}$ is a continuous mask transmission fitness function and can be used to compute how well contours generated from mask M fit to target layout L.

16. The method of claim 3 comprising:
computing an error of mask M is computed in four focus-exposure conditions and at nominal conditions.

17. The method of claim 3 wherein the cost function is a continuous and differentiable function.

18. The method of claim 3 wherein the cost function comprises transmission numbers that are bounded.

19. The method of claim 3 wherein $F_{mask}$ comprises a mask fitness function finds pixels having transmission values bigger than $m_1$ or smaller than $m_0$, or both.

20. The method of claim 3 wherein $F_{mask}(M)=\Sigma\Sigma\Gamma_{tr}(M(x, y))^2$.

* * * * *